US006894698B2

(12) United States Patent
Deering et al.

(10) Patent No.: US 6,894,698 B2
(45) Date of Patent: May 17, 2005

(54) RECOVERING ADDED PRECISION FROM L-BIT SAMPLES BY DITHERING THE SAMPLES PRIOR TO AN AVERAGING COMPUTATION

(75) Inventors: Michael F. Deering, Los Altos, CA (US); N. David Naegle, Pleasanton, CA (US); Scott R. Nelson, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 664 days.

(21) Appl. No.: 09/760,512

(22) Filed: Jan. 11, 2001

(65) Prior Publication Data

US 2002/0005854 A1 Jan. 17, 2002

Related U.S. Application Data

(60) Provisional application No. 60/214,597, filed on Jun. 27, 2000, and provisional application No. 60/175,384, filed on Jan. 11, 2000.

(51) Int. Cl.$^7$ .............................. G09G 5/02; G06K 9/40; G06K 15/00
(52) U.S. Cl. ....................... 345/596; 382/275; 358/3.13
(58) Field of Search ................................. 345/596, 611, 345/543, 555, 597, 530; 358/3.1, 3.19, 534; 708/313, 291, 551; 375/240; 382/275

(56) References Cited

U.S. PATENT DOCUMENTS

| | | | |
|---|---|---|---|
| 5,594,854 A | | 1/1997 | Baldwin et al. |
| 5,598,184 A | * | 1/1997 | Barkans ....................... 345/597 |
| 6,144,365 A | * | 11/2000 | Young et al. ................ 345/600 |
| 6,154,195 A | * | 11/2000 | Young et al. ................ 345/596 |
| 6,215,913 B1 | * | 4/2001 | Clatanoff et al. ............ 382/275 |
| 6,476,824 B1 | * | 11/2002 | Suzuki et al. ................ 345/690 |
| 6,661,421 B1 | * | 12/2003 | Schlapp ....................... 345/530 |

OTHER PUBLICATIONS

"Improving A/D Converter Performance using Dither," © 1995 National Semiconductor Corporation, pp. 1–7.
Paddock, "A Guide to online information about: Noise/Chaos/Random Numbers and Linear Feedback Shift Registers," Aug. 1999, ©Circuit Cellar, pp. 1–14.
James J. Collins, Thomas T. Imhoff, and Peter Grigg, "Nose–enhanced tactile sensation", Nature, vol. 383, Oct. 31, 1996, p. 770 (one page only).
Bruce J. Gluckman, et al., "Stochastic Resonance in a Neuronal Network from Mammalian Brain", The American Physical Society, Physical Review Letters, vol. 77, No. 19, Nov. 4, 1996, pp. 4098–4101.

* cited by examiner

*Primary Examiner*—Matthew C. Bella
*Assistant Examiner*—Anthony J Blackman
(74) *Attorney, Agent, or Firm*—Meyertons Hood Kivlin Kowert & Goetzel, P.C.; Jeffrey C. Hood; Mark K. Brightwell

(57) ABSTRACT

A dithering system comprising a dithering unit, a storage medium, and an averaging unit. The dithering unit is configured to receive a set of data values, to add dither values to the data values, and to truncate the resultant addition values to L-bit truncated values. The storage medium is configured to store the L-bit truncated values. The averaging unit is configured to read the L-bit truncated values from the storage medium, and to compute an average value using at least a subset of the L-bit truncated values. The dither values may have an average value of approximately one-half. The dither values may approximate a uniform distribution of numbers between $-A+\frac{1}{2}$ and $A+\frac{1}{2}$, wherein A is greater than or equal to one. Alternatively, the dithering unit may receive a temporal stream of data values, and the average unit may perform a temporal average (e.g. an FIR filter). The dithering system may be incorporated in a graphics system. In this case, data values may represent rendered sample values (e.g. color or alpha).

40 Claims, 25 Drawing Sheets

| i | Xi | Di | Si | Trn(Si) | Trn(Xi+1/2) |
|---|-----|------|--------|---------|-------------|
| 0 | 9 | 4/8 | 9 4/8 | 9 | 9 |
| 1 | 9 1/8 | 3/8 | 9 4/8 | 9 | 9 |
| 2 | 9 1/8 | 5/8 | 9 6/8 | 9 | 9 |
| 3 | 9 2/8 | 2/8 | 9 4/8 | 9 | 9 |
| 4 | 9 3/8 | 6/8 | 10 1/8 | 10 | 9 |
| 5 | 9 1/8 | 1/8 | 9 2/8 | 9 | 9 |
| 6 | 9 2/8 | 7/8 | 10 1/8 | 10 | 9 |
| 7 | 9 3/8 | 0/8 | 9 3/8 | 9 | 9 |
| 8 | 9 | 8/8 | 10 | 10 | 9 |
| 9 | 9 2/8 | - 1/8 | 9 1/8 | 9 | 9 |
| 10 | 9 3/8 | 9/8 | 10 4/8 | 10 | 9 |
| 11 | 9 1/8 | - 2/8 | 8 7/8 | 8 | 9 |
| 12 | 9 | 10/8 | 10 2/8 | 10 | 9 |
| 13 | 9 2/8 | - 3/8 | 8 7/8 | 8 | 9 |
| 14 | 9 1/8 | 11/8 | 10 4/8 | 10 | 9 |
| 15 | 9 3/8 | - 4/8 | 8 7/8 | 8 | 9 |

$$\sum_{i=0}^{15} X_i = 147 \tfrac{1}{8}$$

$$\sum_{i=0}^{15} Trn(S_i) = 147$$

$$\sum_{i=0}^{15} Trn(X_i + \tfrac{1}{2}) = 144$$

Fig. 18

RECOVERING ADDED PRECISION FROM L-BIT SAMPLES BY DITHERING THE SAMPLES PRIOR TO AN AVERAGING COMPUTATION

CROSS-REFERENCE TO RELATED APPLICATIONS

This application claims the benefit of U.S. Provisional Application No. 60/214,597, filed on Jun. 27, 2000, and titled "Recovering Added Precision from L-Bit Samples by Dithering the Samples Prior to an Averaging Computation".

This application claims the benefit of U.S. Provisional Application No. 60/175,384, filed on Jan. 11, 2000, and titled "Photorealistic Hardware Antialiasing".

BACKGROUND OF THE INVENTION

1. Field of the Invention

This invention relates generally to the field of digital signal processing and, more particularly, to a system and method for operating on data values so that their average (with respect to time and/or space) survives truncation.

2. Description of the Related Art

Modern computer systems typically rely on a graphics system to generate output video signals for the display devices. Early graphics systems were only responsible for receiving data produced by the host processor and displaying it on a monitor device. In essence, they acted as simple translators or interfaces. Modern graphics systems, however, incorporate graphics processors with a great deal of processing power. They now act more like coprocessors rather than simple translators. This change has resulted in an increase in both the complexity and amount of data being sent to the display devices. For example, modern display devices have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the host processor would spend a great deal of time performing graphics calculations. This could rob the host processor of the processing power needed for performing other tasks associated with program execution, and thereby dramatically reduce the overall performance of the computer system. With a powerful graphics system, however, when the host processor is instructed to draw a box on the screen, the host processor may send a request to the graphics system stating "draw a box at these coordinates." The graphics system may then compute the position and color of each pixel comprising the box. The host processor is thus liberated from the time consuming draw or render process.

Generally, a graphics system is a type of video adapter that contains its own processor to boost performance levels. These processors are specialized for computing graphical transformations, and thus, they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their computer systems.

Since graphics systems typically perform only a limited set of functions, they may be customized and therefore are far more efficient at graphics operations than the computer's general-purpose CPU. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

Prior art graphics systems use a conventional frame buffer for refreshing pixel/video data on a display device (e.g. a monitor device or projection device). The frame buffer stores rows and columns of pixels that exactly correspond to respective row and column locations on the display device. Prior art graphics systems render 2D and/or 3D images or objects into the frame buffer in pixel form, and then read the pixels from the frame buffer during a screen refresh to refresh the display device. Thus, the frame buffer stores the output pixels that are provided to the display device. To reduce visual artifacts that may be created by refreshing the screen at the same time the frame buffer is being updated, frame buffers in most graphics systems are double-buffered.

To obtain more realistic images, some prior art graphics systems have gone further by generating more than one sample per pixel. As used herein, the term "sample" refers to information calculated at a particular point on an object or image, i.e. information such as one or more of color, depth (z), transparency, etc. For example a sample may comprise the following component values: a red value, a green value, a blue value, a z-depth value, and an alpha value (e.g., representing the transparency of the sample). A sample may also comprise other information, e.g, a blur value, an intensity value, brighter-than-bright information, and an indicator that the sample partially or completely comprises control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a conventional frame buffer. The conventional frame buffer is typically double-buffered, with one side being used for refreshing the display device while the other side is updated by the filtering hardware. These systems, however, have generally suffered from limitations imposed by the conventional frame buffer, and by the added latency caused by the render buffer and filtering hardware. Therefore, an improved graphics system is desired which includes the benefits of pixel super-sampling while avoiding the drawbacks of the conventional frame buffer.

One of the factors determining the quality of the video output generated by a display device as perceived by humans is the number $N_Q$ of bits of precision delivered to the display device per pixel per color value by the graphics system. A number of adverse perceptual effects may be observed when the value $N_Q$ is not sufficiently large. For example, with 24-bit color, i.e. eight bits each for red, green and blue, a smoothly varying color field may appear stair-stepped. (Experimental evidence indicates that the limit of human perceptual sensitivity is approximately 12 bits of linear quantization for the lighting conditions likely to prevail in typical display applications. It is noted that under some very special conditions human perceptual sensitivity has been demonstrated up to approximately 13 bits.) Thus, increasing the value $N_Q$ is generally desirable. However, a larger value for $N_Q$ implies a larger and more costly pixel frame buffer. It may be difficult for a graphics system to realize a value for $N_Q$ which is large enough to eliminate (or sufficiently reduce) the adverse perceptual effects since the associated memory costs may be high. In certain situations, the video output generated by a graphics system may be targeted for a non-human sensing system. For example, the video output may used to train another computer system such as a machine vision system. Thus, there may be a demand for the graphics system to generate bit precisions (for pixel color or intensity) higher than the limit of human perceptual sensitivity. Therefore, there exists a need for a system and method capable of delivering increased pixel color (or intensity) precision from lower precision sample color values.

More broadly, in the field of signal processing, there exists a problem that may be stated as follows. Suppose that there exists a collection of data values each having a precision of K bits. Suppose that each of the data values are rounded to L bits, where L is smaller than K. Suppose that a processing unit computes a weighted average $AVG_{rnd}$ of the rounded data values. If the same weighted average computation were performed on the original collection of K-bit data values, resulting in an average value $AVG_{orig}$, it would be readily observed that the two averages, $AVG_{rnd}$ and $AVG_{orig}$, differ significantly. In other words, the average of a set of data values is not generally preserved through a rounding operation. Thus, there exists a need for a system and method which could modify the data values so that the average of the rounded data values after modification would more closely approximate the true average $AVG_{orig}$ of the original K-bit data values.

It has been observed that biological systems are capable of providing increased signal sensitivity by an appropriate use of noise. This phenomenon, known as "stochastic resonance", is described in the following references:

(1) J. J. Collins, T. T. Imhoff, and P. Grigg, 1996, "Noise enhanced tactile sensation", Nature 383(October 31):769; and (2) F. J. Gluckman, W. L. Ditto, M. L. Spano, and S. J. Schiff, 1996, "Stochastic resonance in a neuronal network from mammalian brain", Physical Review Letters 77(November 4):4098.

The signal processing technique known as dithering may be considered as a form a stochastic resonance. Dithering has been applied in the field of software rendering to address the problem of false contouring. For example, there exists a rendering package known as Renderman® that includes an algorithm for dithering an array of pixel values. See pages 184–185 of "The Renderman Companion" by Steve Upstill, 1990, Addison Wesley Publishing. However, traditional attempts at dithering have typically been limited to off-line, software applications. Thus, there exists a need for a system and method capable of correcting the problem of false contouring in real-time, and more particularly, in the context of a real-time supersampled graphics system.

SUMMARY OF THE INVENTION

A graphics system may, in one embodiment, comprise one or more rendering units, a dithering unit, a sample buffer, and one or more sample-to-pixel calculation units. The rendering units may compute a plurality of sample values corresponding to positions in a two-dimensional virtual screen space. The dithering unit is configured to receive a spatially co-located group of sample values from a rendering unit. The sample values may represent color values (e.g. red, green, or blue values), alpha values, etc. The dithering unit adds dither values to the sample values, truncates the resultant addition values to L-bit truncated values (where L is an integer), and stores the L-bit truncated values into the sample buffer. The truncation length L may take any of a variety of values. For example, in one embodiment L equals ten.

One of the sample-to-pixel calculation units reads the L-bit truncated values from the sample buffer, and generates an M-bit pixel value by filtering the L-bit truncated values, where M is an integer larger than L. As a result of the dithering performed by the dithering unit, the M-bit pixel value may more closely approximate the ideal pixel value which would be obtained from filtering the originally rendered (high precision) sample values. In one alternative embodiment, the dithering unit may be comprised within the rendering unit(s).

In one embodiment, the sample-to-pixel calculation unit may filter the L-bit truncated values by computing a weighted average of at least a subset of the L-bit truncated values. The weighted average may involve several groups (i.e. bins) of L-bit truncated values.

In one set of embodiments, the dither values may have an average value of one-half (or approximately one-half). In particular, the dither values may approximate a uniform distribution of numbers between $-A+\frac{1}{2}$ and $A+\frac{1}{2}$, where A is a rational number greater than or equal to one. In one embodiment, A equals one. The dithering unit may be configured to add the dither values and the sample values so that the ½ bit position of the dither values is aligned with the most significant bit position which is to be removed in truncating each of the resultant values.

In another set of embodiments, the dither values may have an average value of zero (or approximately zero). In particular, the dither values may approximate a uniform distribution of numbers between $-A$ and $A$, where A is a rational number greater than or equal to one. In these embodiments, the dither unit adds the dither values to the sample values and adds ½ to the resultant addition values prior to truncation. The addition of ½ and truncation achieve a rounding of resultant addition values down to L bits.

In some embodiments, the sample-to-pixel calculation unit may use the M-bit pixel value to perform gamma correction. In other words, the sample-to-pixel calculation unit may determine a gamma corrected pixel value (e.g. by table lookup) in response to the M-bit pixel value. In order to maximize the precision of the gamma corrected pixel value, the system may maximize the precision length M for any given value of storage length L. Advantageously, dithering may facilitate this maximization. In one embodiment, precision length M is at least 12 and the gamma corrected pixel value has at least 10 bits of precision.

In another embodiment, a dithering system may be implemented comprising a dithering unit, a storage medium, and an averaging unit. The dithering unit is configured to receive a set of data values, to add dither values to the data values, and to truncate the resultant addition values to L-bit truncated values. The storage medium is configured to store the L-bit truncated values. The averaging unit is configured to read the L-bit truncated values from the storage medium and compute an average value using at least a subset of the L-bit truncated values.

In yet another embodiment, a temporal dithering system may be implemented comprising a dithering unit and a temporal averaging unit. The dithering unit is configured to receive a first stream of data values, to add dither values to the data values, and to truncate the resultant addition values in order to generate a second stream of L-bit truncated values. The temporal averaging unit is configured to receive the second stream of L-bit truncated values and compute a time-average on the second stream of L-bit truncated values.

In one embodiment of the temporal averaging system, a storage medium is interposed between the dithering unit and the averaging unit. In a second embodiment, a transmission medium is interposed between the dithering unit and the averaging unit.

BRIEF DESCRIPTION OF THE DRAWINGS

The foregoing, as well as other objects, features, and advantages of this invention may be more completely understood by reference to the following detailed description when read together with the accompanying drawings in which:

FIG. 18 presents a tabulated example for one embodiment of dithering;

Figure 1:
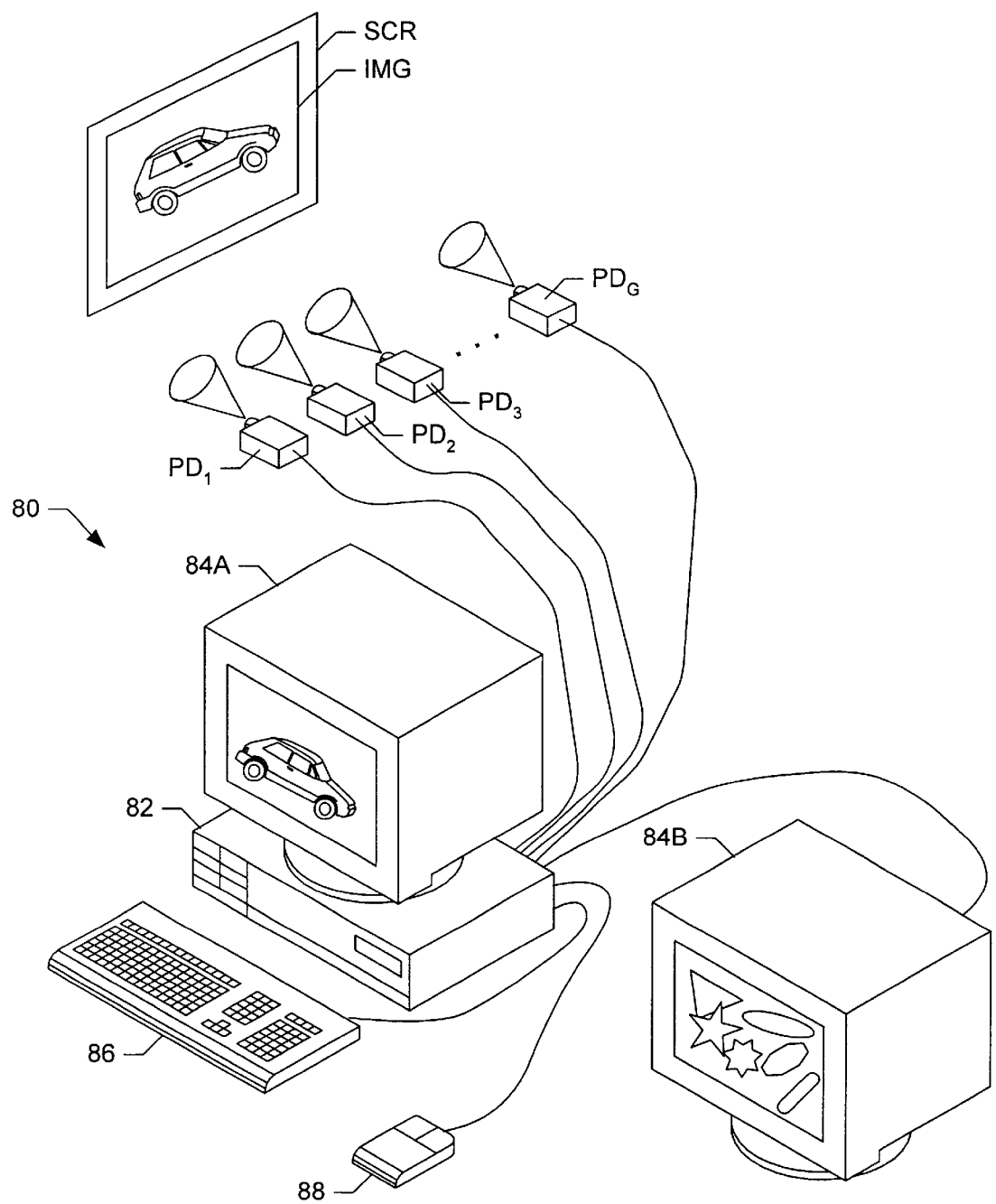
FIG. 1 illustrates a computer system which includes a graphics system 112 for driving one or more display devices (including monitor device 84 and/or projection devices $PD_1$ through $PD_Q$)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the headings are for organizational purposes only and are not meant to limit the description or claims.

DETAILED DESCRIPTION OF SEVERAL EMBODIMENTS

FIG. 1—Computer System

FIG. 1 illustrates one embodiment of a computer system 80 which performs three-dimensional (3-D) graphics. Computer system 80 comprises a system unit 82 which may couple to one or more display devices such as monitor devices 84A and 84B and/or projection devices $PD_1$ through $PD_G$. Monitor devices 84A and 84B may be based on any of a variety of display technologies. For example, monitor devices 84A and 84B may be CRT displays, LCD displays, gas-plasma displays, digital micromirror displays, liquid crystal on silicon (LCOS) display, etc., or any combination thereof. Similarly, projection devices $PD_1$ through $PD_G$ may be realized by any of a variety of projection technologies. For example, projection devices $PD_1$ through $PD_G$ may be CRT-based projectors, LCD projectors, LightValve projectors, gas-plasma projectors, digital micromirror (DMM) projectors, LCOS projectors, etc., or any combination thereof. Monitor devices 84A and 84B are meant to represent an arbitrary number of monitor devices.

Various input devices may be connected to system unit 82, including a keyboard 86, a mouse 88, a video camera, a trackball, a digitizing tablet, a six-degree of freedom input device, a head tracker, an eye tracker, a data glove, body sensors, etc. Application software may be executed by computer system 80 to display 3-D graphical objects on projection screen SCR and/or monitor devices 84A and 84B. It is noted that projection devices $PD_1$ through $PD_Q$ may project their respective component images onto a surface other than a conventional projection screen, and onto surfaces that are curved.

Figure 2A:
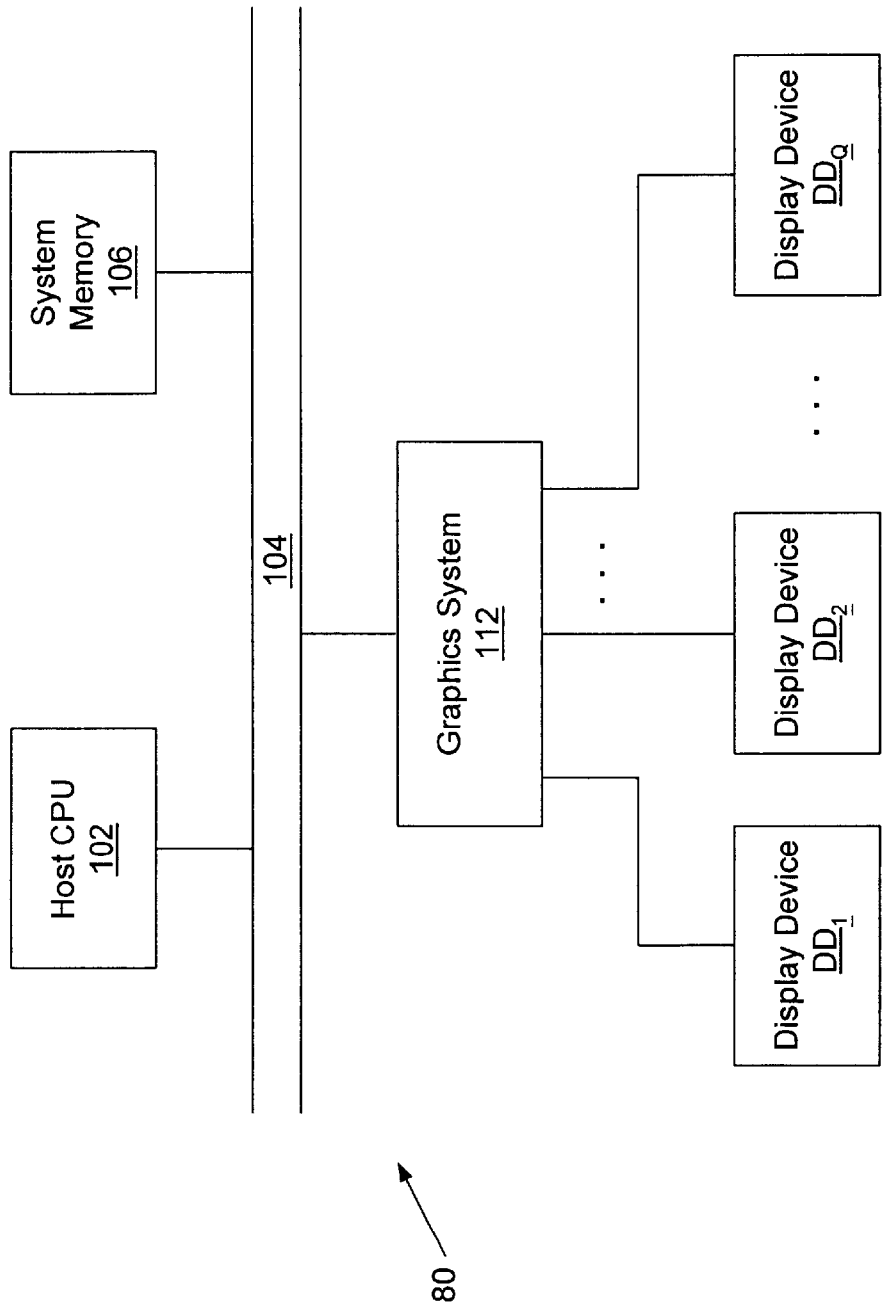
FIG. 2A is a simplified block diagram of the computer system of FIG. 1.

FIG. 2A—Computer System Block Diagram

FIG. 2A presents a simplified block diagram for computer system 80. Computer system 80 comprises a host central processing unit (CPU) 102 and a 3-D graphics system 112 coupled to system bus 104. A system memory 106 may also be coupled to system bus 104. Other memory media devices such as disk drives, CD-ROMs, tape drives, etc. may be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM) and/or random access memory (RAM)—such as static random access memory (SRAM), synchronous dynamic random access memory (SDRAM) and/or Rambus dynamic access memory (RDRAM).

System bus 104 may comprise one or more communication buses or host computer buses (for communication between host processors and memory subsystems). In addition, various peripheral devices and peripheral buses may be connected to system bus 104.

Figure 2B:
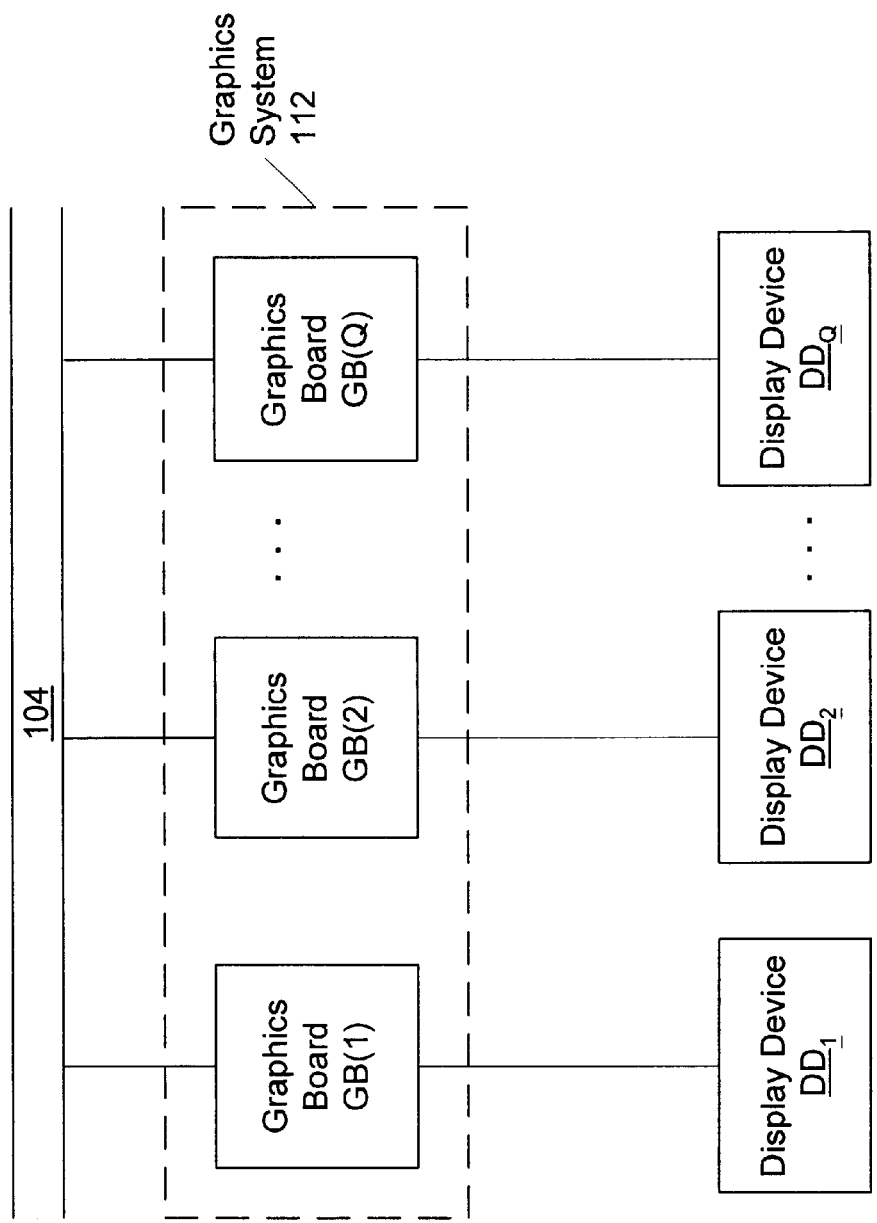
FIG. 2B illustrates one embodiment of graphics system 112 in which graphics cards correspond to projection devices in a one-to-one fashion.
Figure 2C:
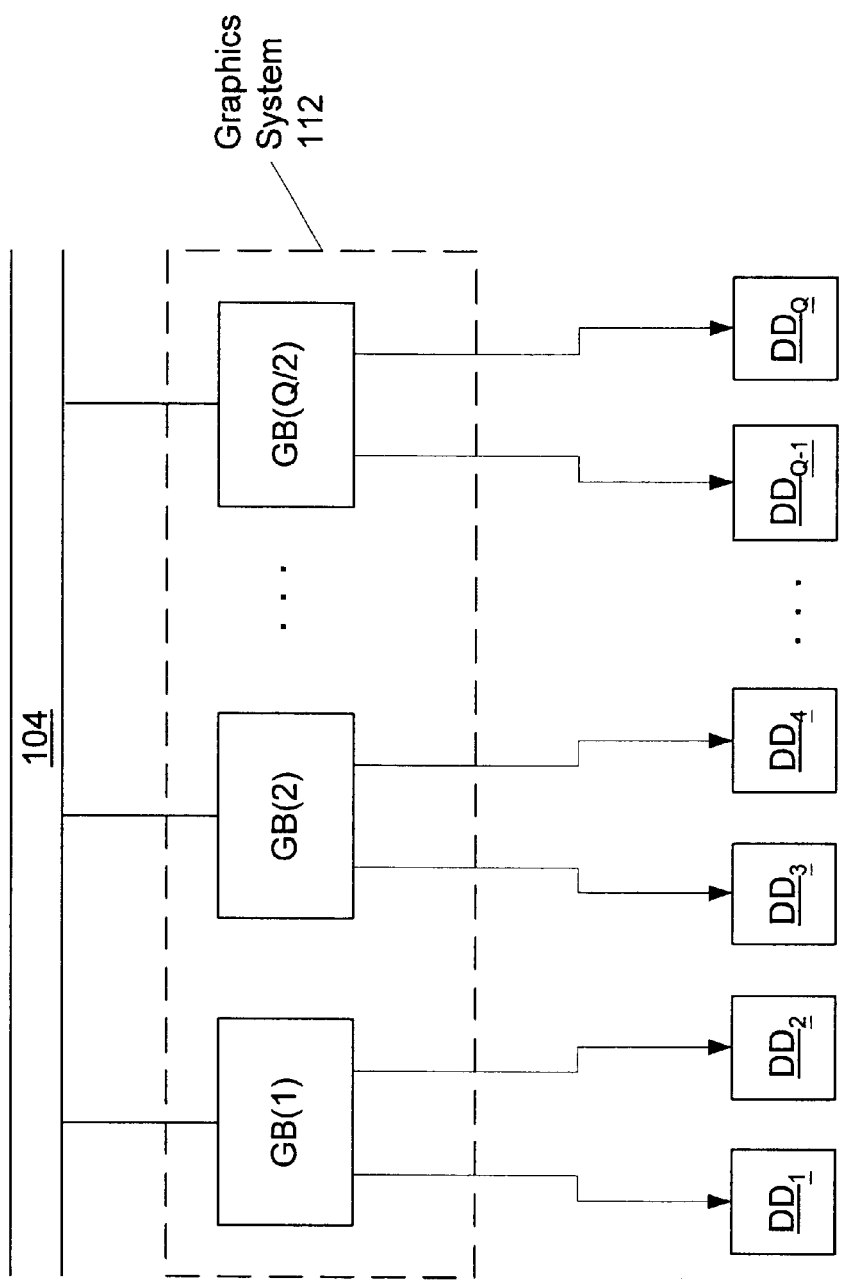
FIG. 2C illustrates another embodiment of graphics system 112 in which each graphics card drives two projection devices.
Figure 2D:
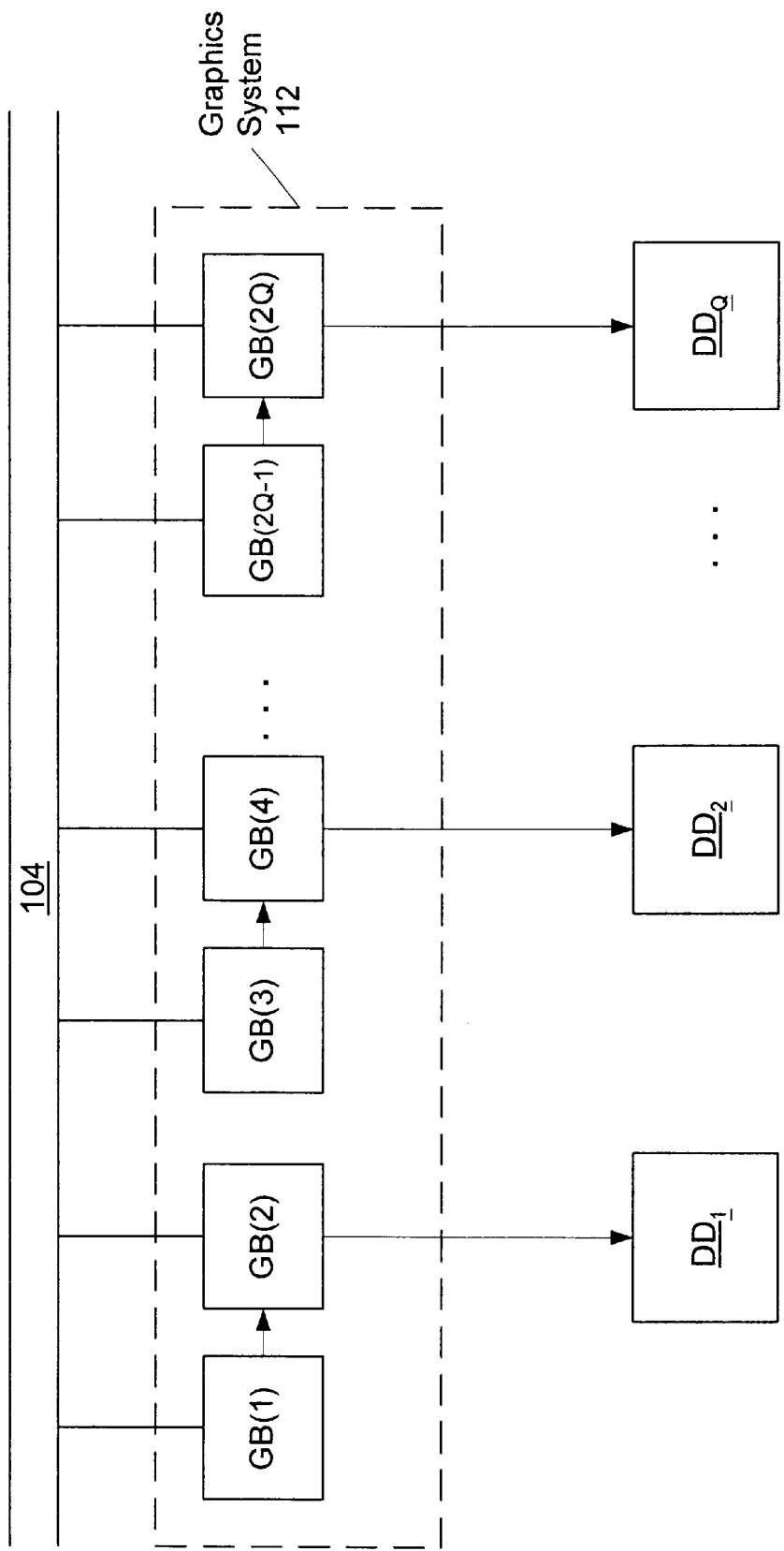
FIG. 2D illustrates yet another embodiment of graphics system 112 in two graphics cards collaborate to generate the video output for each projection device.

Graphics system 112 may comprise one or more graphics boards GB as shown in FIGS. 2B, 2C and 2D. The graphics boards may couple to system bus 104 by any of a variety of connectivity technologies (e.g. crossbar switches). The graphics boards may generate video signals for display devices $DD_1$ through $DD_Q$ in response to graphics commands and data received from one or more graphics applications executing on host CPU 102. The graphics boards comprising graphics system 112 are collectively denoted GB. The $I^{th}$ graphics board in graphics system 112 is denoted GB(I).

In one embodiment, graphics system 112 comprises graphics boards GB(1) through GB(Q) which couple to display devices $DD_1$–$DD_Q$ in a one-to-one fashion as shown in FIG. 2B. In other words, graphics board GB(I) couples to and generates the video signal for display device $DD_1$.

In a second embodiment, graphics system 112 comprises graphics boards GB(1) through GB(Q/2) which couple to display devices $DD_1$–$DD_Q$ in a one-to-two fashion as shown in FIG. 2C. In other words, graphics board GB(I) couples to and generates video signals for two display devices $DD_{2I-1}$ and $DD_{2I}$ where I ranges from 1 to Q/2.

In a third embodiment, graphics system 112 comprises graphics boards GB(1) through GB(2Q) which couple to projection devices $DD_1$–$DD_Q$ in a two-to-one fashion as shown in FIG. 2D. In other words, graphics boards GB(2I-1) and GB(2I) may be daisy chained together to generate a video signal for display device $DD_1$.

A wide distribution of "mappings" between graphics boards and display devices are possible. At one end of the distribution, a single graphics board may drive all Q display devices, where the size of Q is limited by the computational bandwidth of the graphics board. At the other end of the distribution, X graphics boards may drive a single projection device. The size of integer X is determined by the input video bandwidth of the projection device. The X graphics boards may be daisy-chained together, and partition the effort of generating the video signal for the single projection device.

In addition, X graphics boards may map to Q projection devices where neither X nor Q are equal to one. For example, three graphics boards may drive two projection devices. A first graphics board and half of the resources/bandwidth of a second graphics board may be used to generate a first video signal for a first projection device $DD_1$, and a third graphics board together with the remaining half of the resources/bandwidth of the second graphics board may be used to generate a second video signal for a second projection device $DD_2$.

Depending on the embodiment, a user may configure graphics system 112 with any of a variety of board-to-projector mappings. For example, the user may have five projectors: one with large input bandwidth, two with moderate input bandwidth, and two with small input bandwidth. Thus, the user may choose to assign two or more graphics boards to the large bandwidth projector, one graphics board each to the moderate bandwidth projectors, and one graphics board to the two small bandwidth projectors.

It is noted that the graphics boards GB comprising 3-D graphics system 112 may couple to one or more busses of various types in addition to system bus 104. Furthermore, some or all of the graphics boards GB may couple to a communication port, and thereby, directly receive graphics data from an external source such as the Internet or a local area network.

Host CPU 102 may transfer information to/from the graphics boards GB according to a programmed input/output (I/O) protocol over system bus 104. Alternately, graphics board GB may access system memory 106 according to a direct memory access (DMA) protocol or through intelligent bus-mastering.

A graphics application program conforming to an application programming interface (API) such as OpenGL® or Java 3D™ may execute on host CPU 102 and generate commands and data that define geometric primitives such as a polygons for output on display devices $DD_1$, through $DD_Q$. Host CPU 102 may transfer this graphics data to system memory 106. Thereafter, the host CPU 102 may transfer the graphics data to graphics system 112 over system bus 104. In another embodiment, graphics boards GB may read geometry data arrays from system memory 106 using DMA access cycles. In yet another embodiment, graphics boards GB may be coupled to system memory 106 through a direct port, such as an Advanced Graphics Port (AGP) promulgated by Intel Corporation.

Graphics boards GB may receive graphics data from any of various sources including host CPU 102, system memory 106 or any other memory, external sources such as a network (e.g., the Internet) or a broadcast medium (e.g. television). While graphics system 112 is depicted as part of computer system 80, graphics system 112 may also be configured as a stand-alone device.

Graphics system 112 may be comprised in any of various systems, including a network PC, an Internet appliance, a gaming playstation, a television (including an HDTV system or an interactive television system), or other devices which display 2D and/or 3D graphics.

Figure 3:
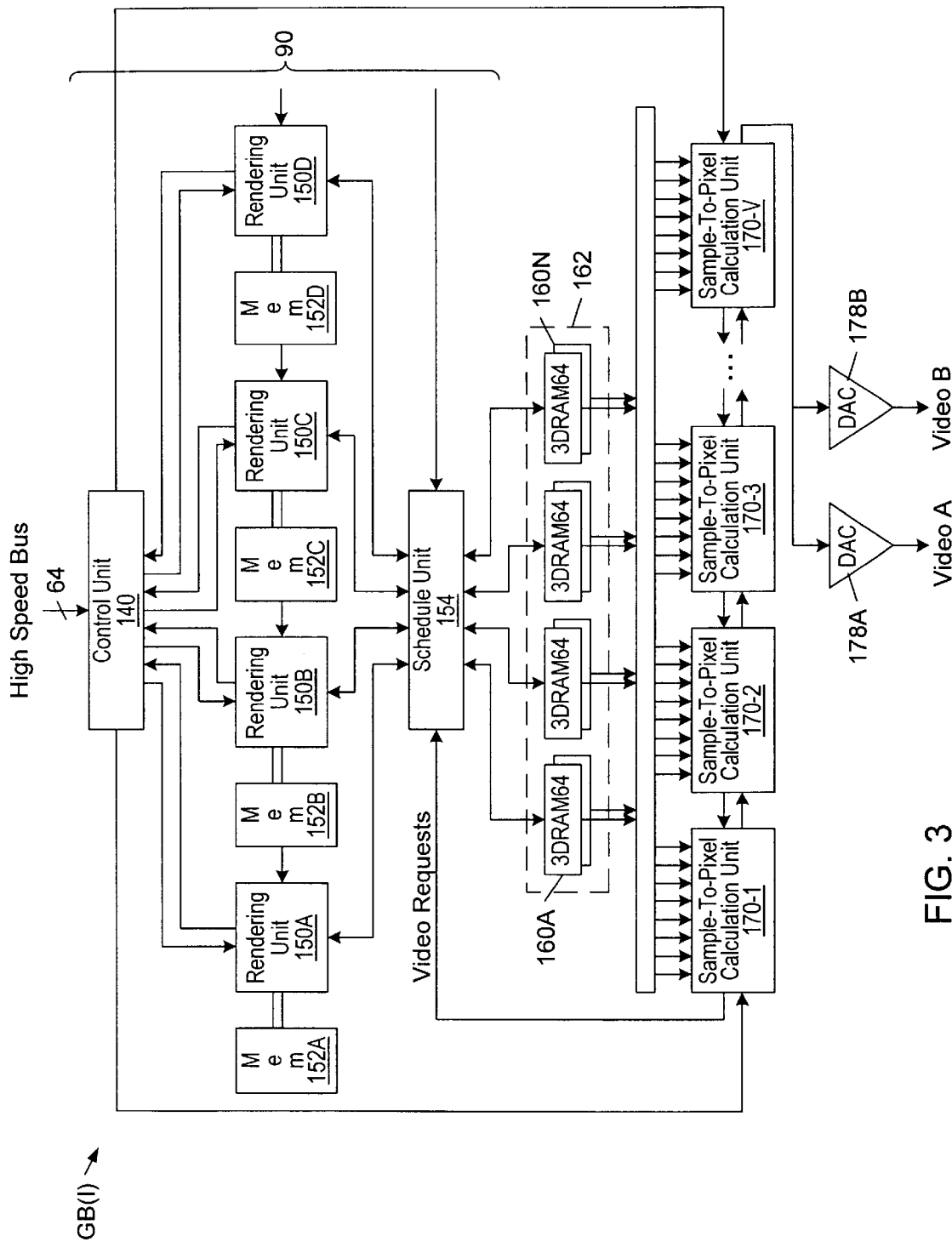
FIG. 3 is a block diagram illustrating one embodiment of a graphics card GB(I)

FIG. 3—Graphics Board GB(I)

FIG. 3 presents a block diagram for one embodiment of graphics board GB(I). Graphics board GB(I) may comprise a graphics processing unit (GPU) 90, one or more super-sampled sample buffers 162, and one or more sample-to-pixel calculation units 170-1 through 170-V. Graphics board GB(I) may also comprise two digital-to-analog converters (DACs) 178A and 178B. In other embodiments, graphics board GB(I) may comprise more or less than two digital-to-analog converters.

Graphics processing unit 90 may comprise any combination of processing technologies. For example, graphics processing unit 90 may comprise specialized graphics processors or calculation units, multimedia processors, DSPs, general-purpose processors, programmable logic, reconfigurable logic, or discrete logic.

In one embodiment, graphics processing unit 90 may comprise one or more rendering units 150A–D. Graphics processing unit 90 may also comprise one or more control units 140, one or more data memories 152A–D, and one or more schedule units 154. Sample buffer 162 may comprise one or more sample memories 160A–160P.

A. Control Unit 140

Control unit 140 operates as the interface between graphics board GB(I) and computer system 80 by controlling the transfer of data between graphics board GB(I) and computer system 80. In embodiments of graphics board GB(I) that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. Graphics data compression may advantageously reduce the required transfer bandwidth between computer system 80 and graphics board GB(I). In one embodiment, control unit 140 may be configured to split and route the received data stream to rendering units 150A–D in compressed form.

The graphics data may comprise one or more graphics primitives. As used herein, the term graphics primitive includes polygons, parametric surfaces, splines, NURBS (non-uniform rational B-splines), sub-division surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996.

It is noted that the embodiments and examples presented herein are described in terms of polygons for the sake of simplicity. However, any type of graphics primitive may be used instead of or in addition to polygons in these embodiments and examples.

B. Rendering Units 150A–D

Rendering units 150A–D (also referred to herein as draw units) are configured to receive graphics instructions and data from control unit 140 and then perform a number of functions which depend on the exact implementation. For example, rendering units 150A–D may be configured to perform decompression (if the received graphics data is presented in compressed form), transformation, clipping, lighting, texturing, depth cueing, transparency processing, set-up, visible object determination, and virtual screen rendering of various graphics primitives occurring within the graphics data.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). Rendering units 150A–D may also be configured to decode graphics data that has been compressed using geometric compression. Geometric compression of 3D graphics data may achieve significant reductions in data size while retaining most of the image quality. A number of methods for compressing and decompressing 3D geometry are described in:

U.S. Pat. No. 5,793,371, application Ser. No. 08/511,294, filed on Aug. 4, 1995, entitled "Method And Apparatus For Geometric Compression Of Three-Dimensional Graphics Data," and U.S. patent application Ser. No. 09/095,777, filed on Jun. 11, 1998, entitled "Compression of Three-Dimensional Geometry Data Representing a Regularly Tiled Surface Portion of a Graphical Object."

In embodiments of graphics board GB(I) that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Each rendering unit 150 may be any suitable type of high performance processor (e.g., a specialized graphics processor or calculation unit, a multimedia processor, a digital signal processor, or a general purpose processor).

Transformation refers to applying a geometric operation to a primitive or an object comprising a set of primitives. For example, an object represented by a set of vertices in a local coordinate system may be embedded with arbitrary position, orientation, and size in world space using an appropriate sequence of translation, rotation, and scaling transformations. Transformation may also comprise reflection, skewing, or any other affine transformation. More generally, transformations may comprise non-linear operations.

Lighting refers to calculating the illumination of the objects. Lighting computations result in an assignment of color and/or brightness to objects or to selected points (e.g. vertices) on objects. Depending upon the shading algorithm being used (e.g., constant, Gourand, or Phong shading), lighting may be evaluated at a number of different locations. For example, if constant shading is used (i.e., the lighted surface of a polygon is assigned a constant illumination value), then the lighting need only be calculated once per polygon. If Gourand shading is used, then the lighting is calculated once per vertex. Phong shading calculates the lighting on a per-sample basis.

Clipping refers to the elimination of graphics primitives or portions of graphics primitives which lie outside of a 3-D view volume in world space. The 3-D view volume may represent that portion of world space which is visible to a virtual observer situated in world space. For example, the view volume may be a solid cone generated by a 2-D view window and a view point located in world space. The solid cone may be imagined as the union of all rays emanating from the view point and passing through the view window. The view point may represent the world space location of the virtual observer. Primitives or portions of primitives which lie outside the 3-D view volume are not currently visible and may be eliminated from further processing. Primitives or portions of primitives which lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport which may be more convenient for clipping against.

Graphics primitives or portions of primitives which survive the clipping computation may be projected onto a 2-D viewport depending on the results of a visibility determination. Instead of clipping in 3-D, graphics primitives may be projected onto a 2-D view plane (which includes the 2-D viewport) and then clipped with respect to the 2-D viewport.

Virtual screen rendering refers to calculations that are performed to generate samples for projected graphics primitives. For example, the vertices of a triangle in 3-D may be projected onto the 2-D viewport. The projected triangle may be populated with samples, and values (e.g. red, green, blue and z values) may be assigned to the samples based on the corresponding values already determined for the projected vertices. (For example, the red value for each sample in the projected triangle may be interpolated from the known red values of the vertices.) These sample values for the projected triangle may be stored in sample buffer 162. A virtual image accumulates in sample buffer 162 as successive primitives are rendered. Thus, the 2-D viewport is said to be a virtual screen on which the virtual image is rendered. The sample values comprising the virtual image are stored into sample buffer 162. Points in the 2-D viewport are described in terms of virtual screen coordinates X and Y, and are said to reside in virtual screen space.

When the virtual image is complete, e.g., when all graphics primitives have been rendered, sample-to-pixel calculation units 170 may access the samples comprising the virtual image, and may filter the samples to generate pixel values. In other words, the sample-to-pixel calculation units 170 may perform a spatial convolution of the virtual image with respect to a convolution kernel C(X,Y) to generate pixel values. For example, a red value $R_p$ for a pixel P may be computed at any location $(X_p,Y_p)$ in virtual screen space based on the relation:

$$R_p = \frac{1}{E}\sum C(X_i - X_p, Y_i - Y_p)R(X_i, Y_i),$$

where the summation is evaluated at samples $(X_i,Y_i)$ in the neighborhood of location $(X_p,Y_p)$. Since convolution kernel C(X,Y) is non-zero only in a neighborhood of the origin, the displaced kernel $C(X-X_p,Y-Y_p)$ may take non-zero values only in a neighborhood of location $(X_p,Y_p)$. Similar summations to compute green and blue pixel values in terms of the green and blue sample values respectively may be performed in parallel with the red pixel value summation.

The value E is a normalization value that may be computed according to the relation:

$$E=\Sigma C(X_i-X_p,Y_i-Y_p),$$

where the summation is evaluated for the same samples $(X_i,Y_i)$ as in the red pixel value summation above. The summation for the normalization value E may be performed in parallel with the red, green and/or blue pixel value summations. The location $(X_p,Y_p)$ may be referred to as a pixel center, or a pixel origin. In the case where the convolution kernel C(X,Y) is symmetric with respect to the origin (0,0), the term pixel center is favored. The pixel values may be presented to one or more of display devices $DD_1$ through $DD_Q$.

In the embodiment of graphics board GB(I) shown in FIG. 3, rendering units 150A–D calculate sample values instead of pixel values. This allows rendering units 150A–D to perform super-sampling, i.e. to calculate more than one sample per pixel. Super-sampling is discussed more thoroughly below. More details on super-sampling are discussed in the following books:

"Principles of Digital Image Synthesis" by Andrew S. Glassner, 1995, Morgan Kaufman Publishing (Volume 1);

"The Renderman Companion" by Steve Upstill, 1990, Addison Wesley Publishing; and "Advanced Renderman: Beyond the Companion" by Anthony A. Apodaca.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculation units 170.

It is noted that the 2-D viewport and the virtual image which is rendered with samples into sample buffer 162 may correspond to an area larger than that area which is physically displayed via display devices $DD_1$ through $DD_Q$. For example, the 2-D viewport may include a viewable subwindow. The viewable subwindow represents displayable graphics information, while the marginal area of the 2-D viewport (outside the viewable subwindow) may allow for various effects such as panning and zooming. In other words, only that portion of the virtual image which lies within the viewable subwindow gets physically displayed. In one embodiment, the viewable subwindow equals the whole of the 2-D viewport. In this case, all of the virtual image gets physically displayed.

C. Data Memories

Each of rendering units 150A–D may be coupled to a corresponding one of instruction and data memories 152A–D. In one embodiment, each of memories 152A–D may be configured to store both data and instructions for a corresponding one of rendering units 150A–D. While implementations may vary, in one embodiment, each data memory 152A–D may comprise two 8 MByte SDRAMs, providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of each rendering unit. Data memories 152A–D may also be referred to as texture and render memories 152A–D.

D. Schedule Unit

Schedule unit 154 may be coupled between rendering units 150A–D and sample memories 160A–P. Schedule unit 154 is configured to sequence the completed samples and store them in sample memories 160A–P. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160P, which are configured to store the plurality of samples generated by rendering units 150A–D. As used herein, the term "sample buffer" refers to one or more memories which store samples. As previously noted, samples may be filtered to form each output pixel value. Output pixel values may be provided to one or more of display devices $DD_1$ through $DD_Q$. Sample buffer 162 may be configured to support super-sampling, critical sampling, or sub-sampling with respect to pixel resolution. In other words, the average distance between adjacent samples in the virtual image (stored in sample buffer 162) may be smaller than, equal to, or larger than the average distance between adjacent pixel centers in virtual screen space. Furthermore, because the convolution kernel C(X,Y) may take non-zero functional values over a neighborhood which spans several pixel centers, a single sample may contribute to several output pixel values.

Sample memories 160A–160P may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, where each bank comprises four 3DRAM-64 memories. Together, the 3DRAM-64 memories may form a 116-bit deep super-sampled sample buffer that stores multiple samples per pixel. For example, in one embodiment, each of sample memories 160A–160P may store up to sixteen samples per pixel.

3DRAM-64 memories are specialized memories configured to support full internal double buffering with single buffered Z in one chip. The double buffered portion comprises two RGBX buffers, where X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a double-buffered 1280×1024 super-sampled sample buffer with eight samples per pixel.

Since the 3DRAM-64 memories are internally double-buffered, the input pins for each of the two frame buffers in the double-buffered system are time multiplexed (using multiplexers within the memories). The output pins may be similarly time multiplexed. This allows reduced pin count while still providing the benefits of double buffering. 3DRAM-64 memories further reduce pin count by not having z output pins. Since z comparison and memory buffer selection are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a z comparison, and then writing data back in. Instead, the data may be simply written into the 3DRAM-64 memory, with the memory performing the steps described above internally.

However, in other embodiments of graphics board GB(I), other memories (e.g., SDRAMs, SRAMs, RDRAMs, or current generation 3DRAMs) may be used to form sample buffer 162.

Graphics processing unit 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processing unit 90 determines which samples fall within the polygon based upon the sample positions. Graphics processing unit 90 renders the samples that fall within the polygon and stores rendered samples in sample memories 160A–P. Note as used herein the terms render and draw are used interchangeably and refer to calculating color values for samples. Depth values, alpha values, and other per-sample values may also be calculated in the rendering or drawing process.

F. Sample-to-Pixel Calculation Units

Sample-to-pixel calculation units 170-1 through 170-V (collectively referred to as sample-to-pixel calculation units 170) may be coupled between sample memories 160A–P and DACs 178A and 178B. Sample-to-pixel calculation units 170 are configured to read selected samples from sample memories 160A–P and then perform a filtering operation (e.g. a convolution) on the samples to generate the output pixel values which are provided to DACs 178A and/or 178B. The sample-to-pixel calculation units 170 may be programmable to perform different filter functions at different times depending upon the type of output desired.

In one embodiment, the sample-to-pixel calculation units 170 may implement a super-sample reconstruction band-pass filter to convert the super-sampled sample buffer data (stored in sample memories 160A–P) to pixel values. The support of the band-pass filter may cover a rectangular area in virtual screen space which is $H_p$ pixels high and $W_p$ pixels wide. Thus, the number of samples covered by the band-pass filter is approximately equal to $H_pW_pS$, where S is the number of samples per pixel. A variety of values for $H_p$, $W_p$ and S are contemplated. For example, in one embodiment of the band-pass filter $H_p=W_p=5$. It is noted that with certain sample positioning schemes (see the discussion attending FIGS. 4 & 5), the number of samples that fall within the filter support may vary as the filter center (i.e. pixel center) is moved in the virtual screen space.

In other embodiments, sample-to-pixel calculation units 170 may filter a selected number of samples to calculate an output pixel. The selected samples may be multiplied by a spatial weighting function that gives weights to samples based on their position with respect to the center of the pixel being calculated.

The filtering operations performed by sample-to-pixel calculation units 170 may use any of a variety of filters, either alone or in combination. For example, the filtering operations may comprise convolution with a box filter, a tent filter, a cylindrical filter, a cone filter, a Gaussian filter, a Catmull-Rom filter, a Mitchell-Netravali filter, a windowed sinc filter, etc. Furthermore, the support of the filters used by sample-to-pixel calculation units 170 may be circular, elliptical, rectangular (e.g. square), triangular, hexagonal, etc.

Sample-to-pixel calculation units 170 may also be configured with one or more of the following features: color look-up using pseudo color tables, direct color, inverse gamma correction, filtering of samples to pixels, and conversion of pixels to non-linear light space. Other features of sample-to-pixel calculation units 170 may include programmable video timing generators, programmable pixel clock synthesizers, cursor generators, and crossbar functions. Once the sample-to-pixel calculation units 170 have manipulated the timing and color of each pixel, the pixels are output to DACs 178A and 178B.

G. Digital-to-Analog Converters

Digital-to-Analog Converters (DACs) 178A and 178B—collectively referred to as DACs 178—operate as the final output stage of graphics board GB(I). DACs 178 translate digital pixel data received from calculation units 170 into analog video signals. DAC 178A couples to output video channel A, and DAC 178B couples to output video channel B. DAC 178A may receive a first stream of digital pixel data from one or more of calculation units 170, and converts the first stream into a first video signal which is asserted onto output video channel A. Similarly, DAC 178B may receive a second stream of digital pixel data from one or more of calculation units 170, and converts the second stream into a second video signal which is asserted onto output video channel B. Rather than fixing the allocation of calculation units 170 to output video channels, the preferred embodiment of graphics board GB(I) has a hardware architecture which allows particular calculation units 170 to be assigned to either output video channel on a per session basis. For example, all of calculation units 170 may be assigned to video channel A where graphics board GB(I) is to be used in the one board per projector scenario depicted in FIG. 2B. In situations where graphics board GB(I) is to be used in the "two projector per board" scenario of FIG. 2C, a first subset of the calculation units 170 may be assigned to video channel A, and the remaining calculation units assigned to video channel B.

In the preferred embodiment, sample-to-pixel calculation units 170 provide pixel values to DACs 178 without an intervening frame buffer. However, in one alternate embodiment, sample-to-pixel calculation units 170 output the pixel values to a frame buffer prior to display.

In one embodiment DACs 178 may be bypassed or omitted completely in order to output digital pixel data in lieu of analog video signals. This may be useful where display devices $DD_1$ through $DD_Q$ are based on a digital technology (e.g., an LCD-type display, an LCOS display, or a digital micro-mirror display).

As alluded to above, multiple graphics boards may be chained together so that they share the effort of generating video data for a display device. Thus, in the preferred embodiment, graphics board GB(I) includes a first interface for receiving one or more digital video streams from any previous graphics board in the chain, and a second interface for transmitting digital video streams to any subsequent graphics board in the chain.

It is noted that various embodiments of graphics board GB(I) are contemplated with varying numbers of render units 150, varying numbers of calculation units 170, and more or less than two video output channels, etc.

Figure 4:
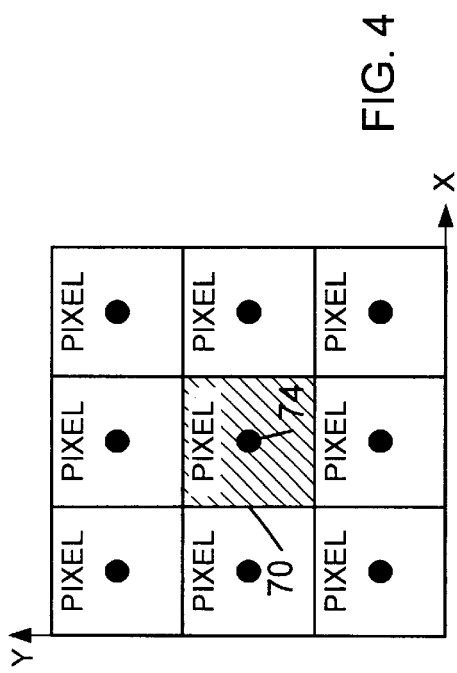
FIG. 4 illustrates a traditional configuration for computation of pixel values.

FIGS. 4–5—Super-sampling

FIG. 4 illustrates a portion of virtual screen space in a non-super-sampled example. The dots denote sample locations, and the rectangular boxes superimposed on virtual screen space define pixel boundaries. One sample is located in the center of each pixel, and values of red, green, blue, z, etc. are computed for the sample. For example, sample 74 is assigned to the center of pixel 70. Although rendering units 150 may compute values for only one sample per pixel, sample-to-pixel calculation units 170 may still compute output pixel values based on multiple samples, e.g. by using a convolution filter whose support spans several pixels.

Figure 5B:
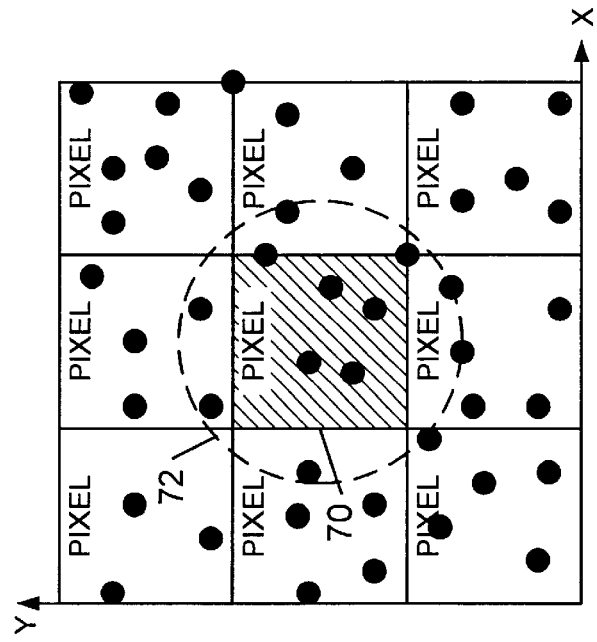
FIG. 5B illustrates a random distribution of samples in a two-dimensional viewport.
Figure 5A:
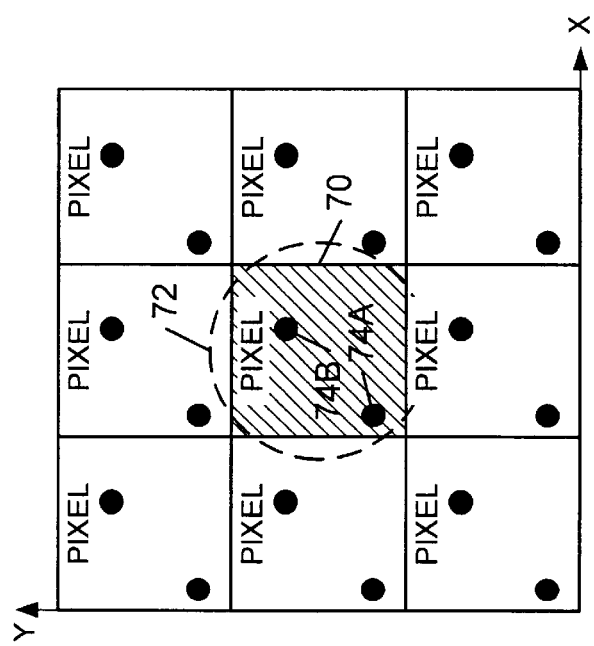
FIG. 5A illustrates one embodiment of super-sampling.

Turning now to FIG. 5A, an example of one embodiment of super-sampling is illustrated. In this embodiment, two samples are computed per pixel. The samples are distributed according to a regular grid. Even though there are more samples than pixels in the figure, output pixel values could be computed using one sample per pixel, e.g. by throwing out all but the sample nearest to the center of each pixel. However, a number of advantages arise from computing pixel values based on multiple samples.

A support region 72 is superimposed over pixel 70, and illustrates the support of a filter which is localized at pixel 70. The support of a filter is the set of locations over which the filter (i.e. the filter kernel) takes non-zero values. In this example, the support region 72 is a circular disc. The output pixel values (e.g. red, green, blue and z values) for pixel 70 are determined only by samples 74A and 74B, because these are the only samples which fall within support region 72. This filtering operation may advantageously improve the realism of a displayed image by smoothing abrupt edges in the displayed image (i.e., by performing anti-aliasing). The filtering operation may simply average the values of samples 74A–B to form the corresponding output values of pixel 70. More generally, the filtering operation may generate a weighted sum of the values of samples 74A–B, where the contribution of each sample is weighted according to some function of the sample's position (or distance) with respect to the center of pixel 70. The filter, and thus support region 72, may be repositioned for each output pixel being calculated. In other words, the filter center may visit the center of each output pixel for which pixel values are to be computed. Other filters and filter positioning schemes are also possible and contemplated.

In the example of FIG. 5A, there are two samples per pixel. In general, however, there is no requirement that the number of samples be related to the number of pixels. The number of samples may be completely independent of the number of pixels. For example, the number of samples may be smaller than the number of pixels. (This is the condition that defines sub-sampling).

Turning now to FIG. 5B, another embodiment of super-sampling is illustrated. In this embodiment, the samples are positioned randomly. Thus, the number of samples used to calculate output pixel values may vary from pixel to pixel. Render units 150A–D calculate color information at each sample position.

FIGS. 6–13—Super-sampled Sample Buffer with Real-time Convolution

Figure 6:
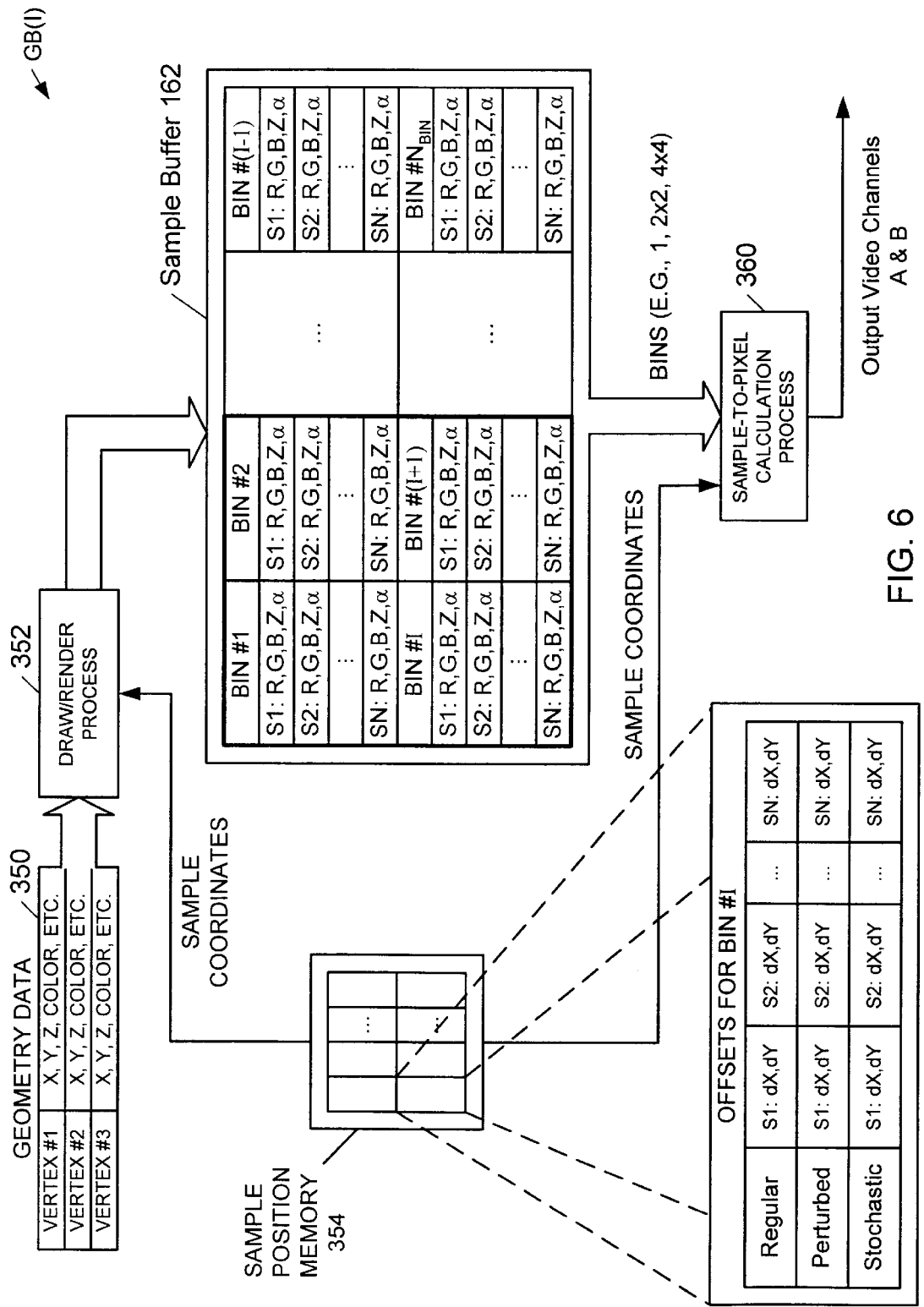
FIG. 6 illustrates one embodiment for the flow of data through graphics card GB(I)

FIG. 6 illustrates one possible configuration for the flow of data through one embodiment of graphics board GB(I). As the figure shows, geometry data 350 is received by graphics board GB(I) and used to perform draw process 352. The draw process 352 is implemented by one or more of control unit 140, rendering units 150, data memories 152, and schedule unit 154. Geometry data 350 comprises data for one or more polygons. Each polygon comprises a plurality of vertices (e.g., three vertices in the case of a triangle), some of which may be shared among multiple polygons. Data such as x, y, and z coordinates, color data, lighting data and texture map information may be included for each vertex.

In addition to the vertex data, draw process 352 (which may be performed by rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of values (e.g. red, green, blue, z, alpha, and/or depth of field information) for each of these samples based on their respective positions within the polygon. For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of memories 152A–152D, or as a separate memory.

Sample position memory 354 may store sample positions in terms of their virtual screen coordinates (X,Y). Alternatively, sample position memory 354 may be configured to store only offsets dX and dY for the samples with respect to positions on a regular grid. Storing only the offsets may use less storage space than storing the entire coordinates (X,Y) for each sample. The sample position information stored in sample position memory 354 may be read by a dedicated sample position calculation unit (not shown) and processed to calculate sample positions for graphics processing unit 90. More detailed information on the computation of sample positions is included below (see description of FIGS. 9 and 10).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIG. 6, sample position memory 354 may be configured to store sample offsets generated according to a number of different schemes such as a regular square grid, a regular hexagonal grid, a perturbed regular grid, or a random (stochastic) distribution. Graphics board GB(I) may receive an indication from the operating system, device driver, or the geometry data 350 that indicates which type of sample positioning scheme is to be used. Thus, sample position memory 354 is configurable or programmable to generate position information according to one or more different schemes. More detailed information on several sample positioning schemes are described further below (see description of FIG. 8).

In one embodiment, sample position memory 354 may comprise a RAM/ROM that contains stochastically determined sample points or sample offsets. Thus, the density of samples in virtual screen space may not be uniform when observed at small scale. Two bins with equal area centered at different locations in virtual screen space may contain different numbers of samples. As used herein, the term "bin" refers to a region or area in virtual screen space.

An array of bins may be superimposed over virtual screen space, i.e. the 2-D viewport, and the storage of samples in sample buffer 162 may be organized in terms of bins. Sample buffer 162 may comprise an array of memory blocks which correspond to the bins. Each memory block may store the sample values (e.g. red, green, blue, z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

Suppose (for the sake of discussion) that the 2-D viewport ranges from (0000,0000) to (FFFF,FFFF) in hexadecimal virtual screen coordinates. This 2-D viewport may be overlaid with a rectangular array of bins whose lower-left corners reside at the locations (XX00,YY00) where XX and YY independently run from 0x00 to 0xFF. Thus, there are 256 bins in each of the vertical and horizontal directions with each bin spanning a square in virtual screen space with side length of 256. Suppose that each memory block is configured to store sample values for up to 16 samples, and that the set of sample values for each sample comprises 4 bytes. In this case, the address of the memory block corresponding to the bin located at (XX00,YY00) may be simply computed by the relation BinAddr=(XX+YY*256)*16*4. For example, the sample S=(1C3B,23A7) resides in the bin located at (1C00,2300). The sample value set for sample S is then stored in the memory block residing at address 0x8C700=(0x231C)(0x40) in sample buffer 162.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the memory blocks in sample buffer 162 which correspond to the bins in virtual screen space will be referred to as memory bins.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. (Other offsets are also possible, e.g., a time offset, a z-offset, etc.) When added to a bin position, each pair defines a particular position in virtual screen space, i.e. the 2-D viewport. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. Draw process 352 then calculates the z and color information (which may include alpha or other depth of field information values) for each of these samples and stores the data into sample buffer 162. In one embodiment, sample buffer 162 may only single-buffer z values (and perhaps alpha values) while double-buffering other sample components such as color. Unlike prior art systems, graphics system 112 may use double-buffering for all samples (although not all components of samples may be double-buffered, i.e., the samples may have some components that are not double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of the 2-D viewport may have a smaller bin capacity than bins corresponding to the center of the 2-D viewport. Since viewers are likely to focus their attention mostly on the center of the screen SCR, more processing bandwidth may be dedicated to providing enhanced image quality in the center of 2-D viewport. Note that the size and shape of bins may also vary from region to region, or from frame to frame. The use of bins will be described in greater detail below in connection with FIG. 11.

In parallel and independently of draw process 352, filter process 360 is configured to: (a) read sample positions from sample position memory 354, (b) read corresponding sample values from sample buffer 162, (c) filter the sample values, and (d) output the resulting output pixel values onto video channels A and/or B. Sample-to-pixel calculation units 170 implement filter process 360. Filter process 360 is operable to generate the red, green, and blue values for an output pixel based on a spatial filtering of the corresponding data for a selected plurality of samples, e.g. samples falling in a neighborhood of the pixel center. Other values such as alpha may also be generated. In one embodiment, filter process 360 is configured to: (i) determine the distance of each sample from the pixel center; (ii) multiply each sample's attribute values (e.g., red, green, blue, alpha) by a filter weight that is a specific (programmable) function of the sample's distance; (iii) generate sums of the weighted attribute values, one sum per attribute (e.g. a sum for red, a sum for green, . . . ), and (iv) normalize the sums to generate the corresponding pixel attribute values. Filter process 360 is described in greater detail below (see description accompanying FIGS. 11, 12A, and 15).

In the embodiment just described, the filter kernel is a function of distance from the pixel center. However, in alternative embodiments, the filter kernel may be a more general function of X and Y displacements from the pixel center. Also, the support of the filter, i.e. the 2-D neighborhood over which the filter kernel takes non-zero values, may not be a circular disk. Any sample falling within the support of the filter kernel may affect the output pixel value being computed.

Figure 7:
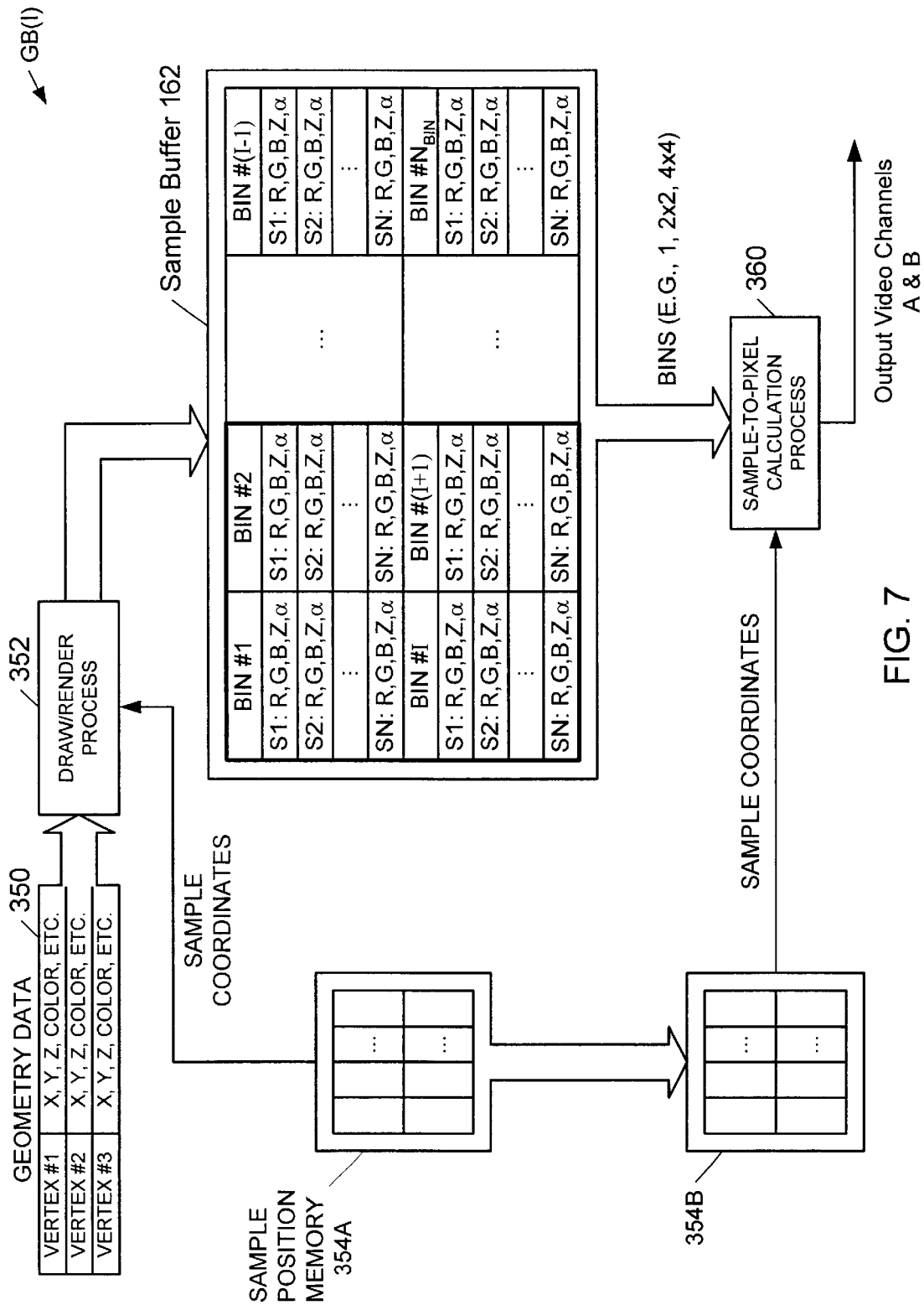
FIG. 7 illustrates another embodiment for the flow of data through graphics card GB(I)

FIG. 7 illustrates an alternate embodiment of graphics board GB(I). In this embodiment, two or more sample position memories 354A and 354B are utilized. Sample position memories 354A–B may be used to implement double-buffering of sample position data. If the sample positions remain the same from frame to frame, the sample positions may be single-buffered. However, if the sample positions vary from frame to frame, then graphics board GB(I) may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by draw process 352 while the other side of memory 354B is accessed by filter process 360. In this configuration, graphics board GB(I) may change sample positioning schemes on a per-frame basis by shifting the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw 352 process to the filter process 360.

Yet another alternative embodiment may store tags to offsets with the sample values in super-sampled sample buffer 162. These tags may be used to look-up the offset (i.e. perturbations) dX and dY associated with each particular sample.

Figure 8:
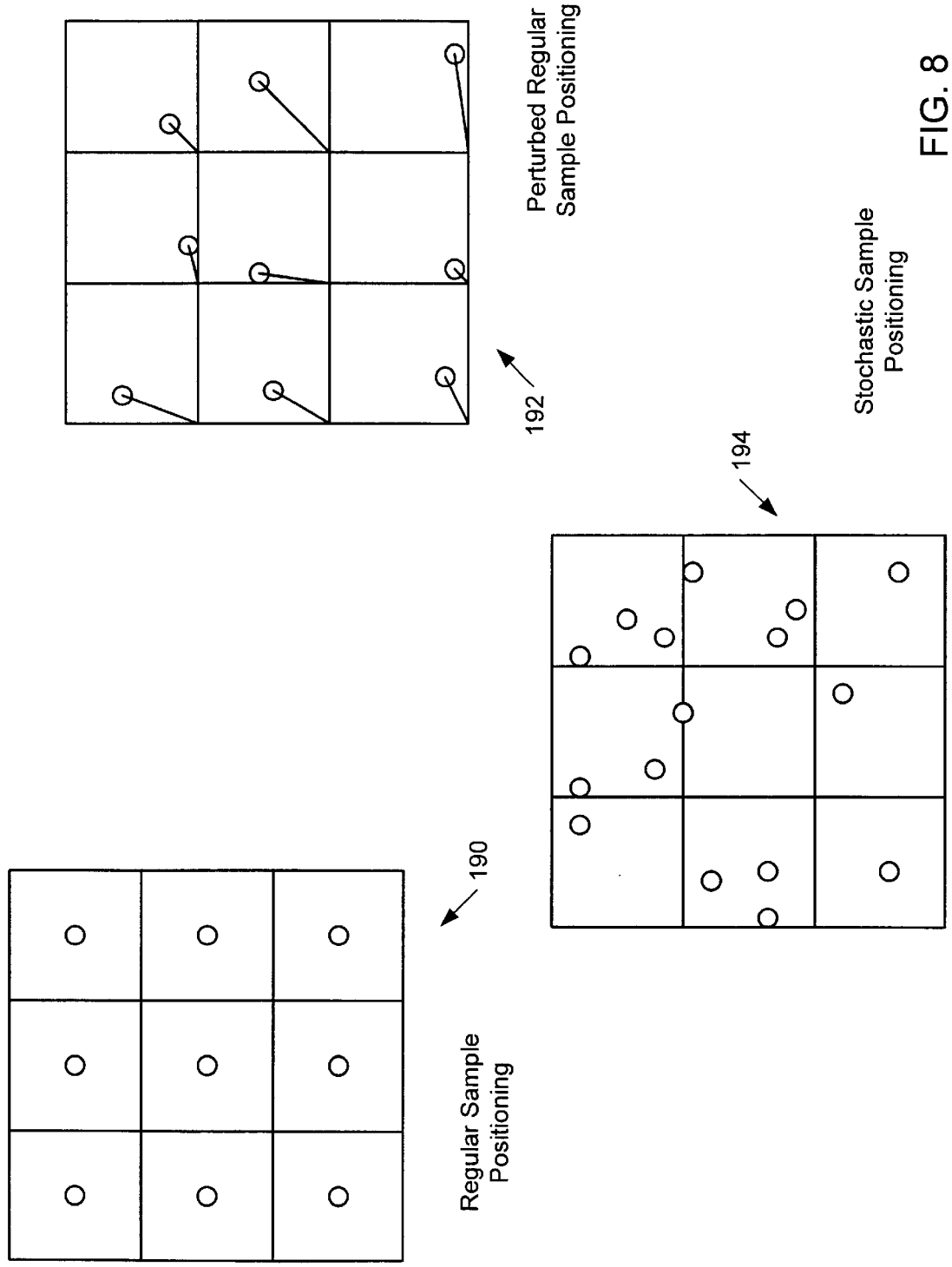
FIG. 8 illustrates three different sample positioning schemes.
Figure 9:
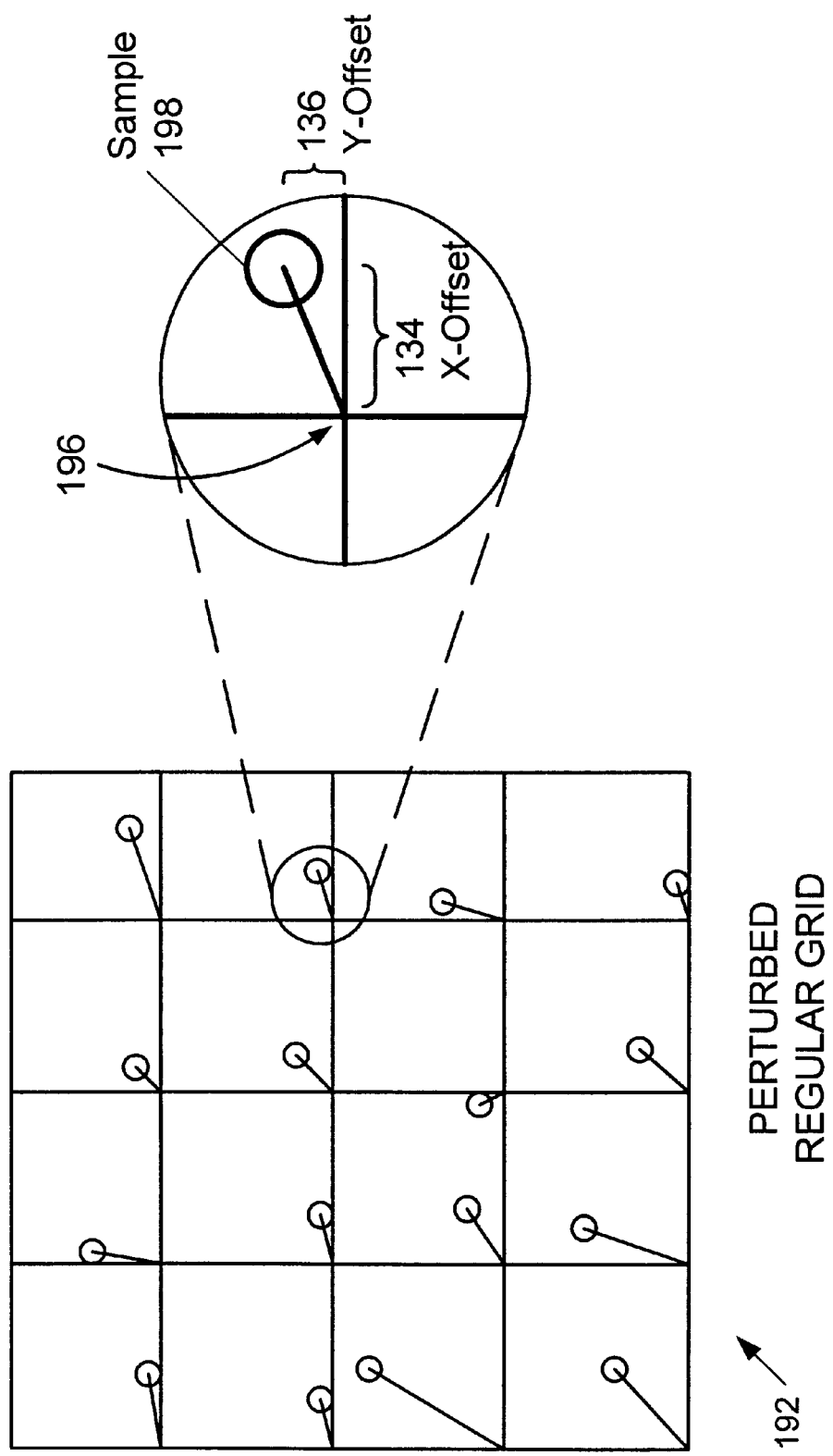
FIG. 9 illustrates one embodiment of a "perturbed regular" sample positioning scheme.
Figure 10:
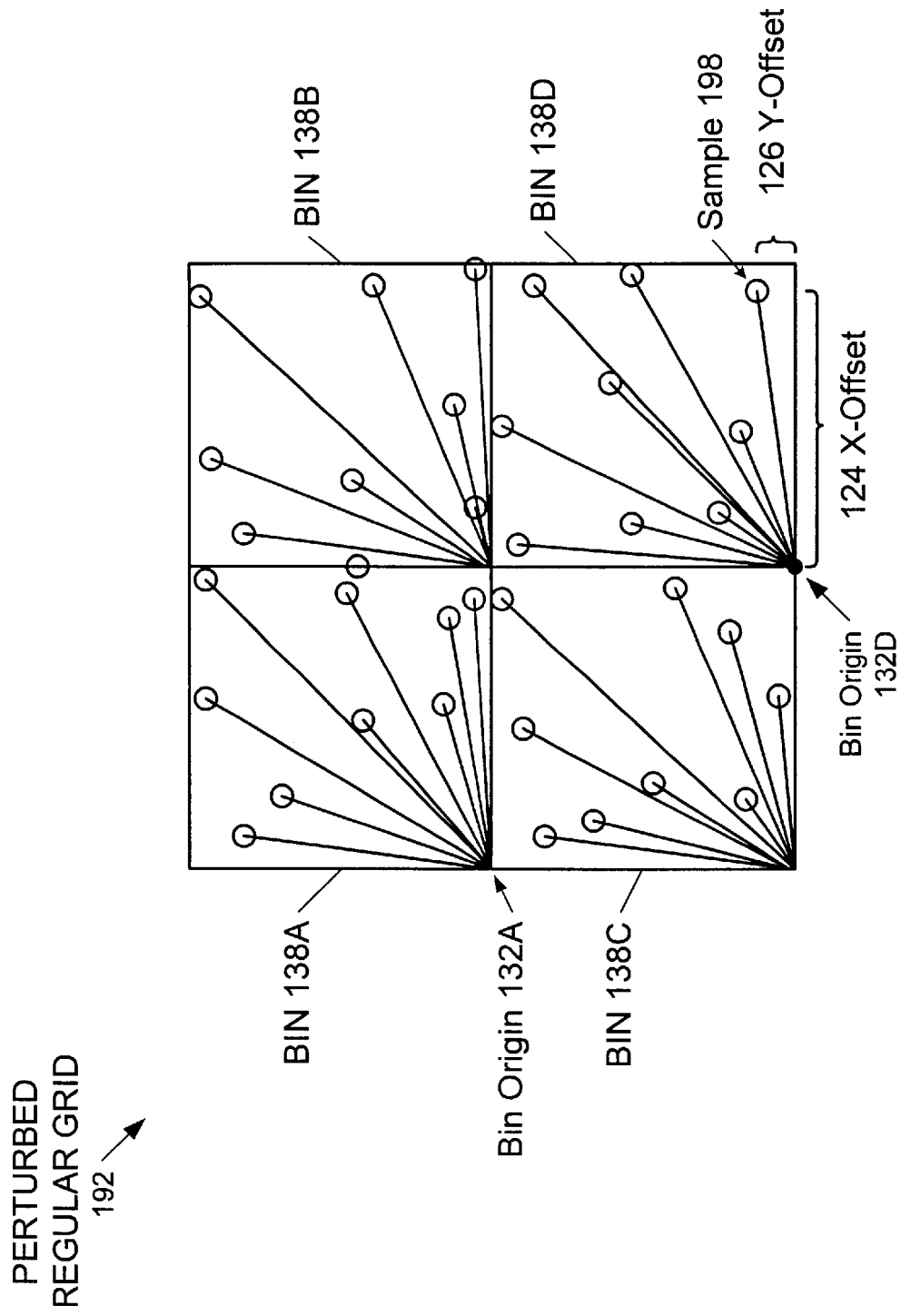
FIG. 10 illustrates another embodiment of the perturbed regular sample positioning scheme.

FIGS. 8–10: Sample Positioning Schemes

FIG. 8 illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by using a pseudo-random function. Once again, perturbed regular grid scheme 192 may be based on any type of regular grid or tiling. Samples generated by perturbation with respect to a grid or hexagonal tiling may particularly desirable due to the geometric properties of these configurations.

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory.

Turning now to FIG. 9, details of one embodiment of perturbed regular positioning scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random x-offset 134 and y-offset 136 may be limited to a particular range of values. For example, the x-offset may be limited to the range from zero to $X_{max}$, where $X_{max}$ is the width of the a grid rectangle. Similarly, the y-offset may be limited to the range from zero to $Y_{max}$, where $Y_{max}$ is the height of a grid rectangle. The random offset may also be specified by an angle and radius with respect to the grid intersection point 196.

FIG. 10 illustrates details of another embodiment of the perturbed regular grid scheme 192. In this embodiment, the samples are grouped into rectangular bins 138A–D. In this embodiment, each bin comprises nine samples, i.e. has a bin capacity of nine. Different bin capacities may be used in other embodiments (e.g., bins storing four samples, 16 samples, etc.). Each sample's position may be determined by an x-offset and y-offset relative to the origin of the bin in which it resides. The origin of a bin may be chosen to be the lower-left corner of the bin (or any other convenient location within the bin). For example, the position of sample 198 is determined by summing x-offset 124 and y-offset 126 respectively to the x and y coordinates of the origin 132D of bin 138D. As previously noted, this may reduce the size of sample position memory 354 used in some embodiments.

Figure 11:
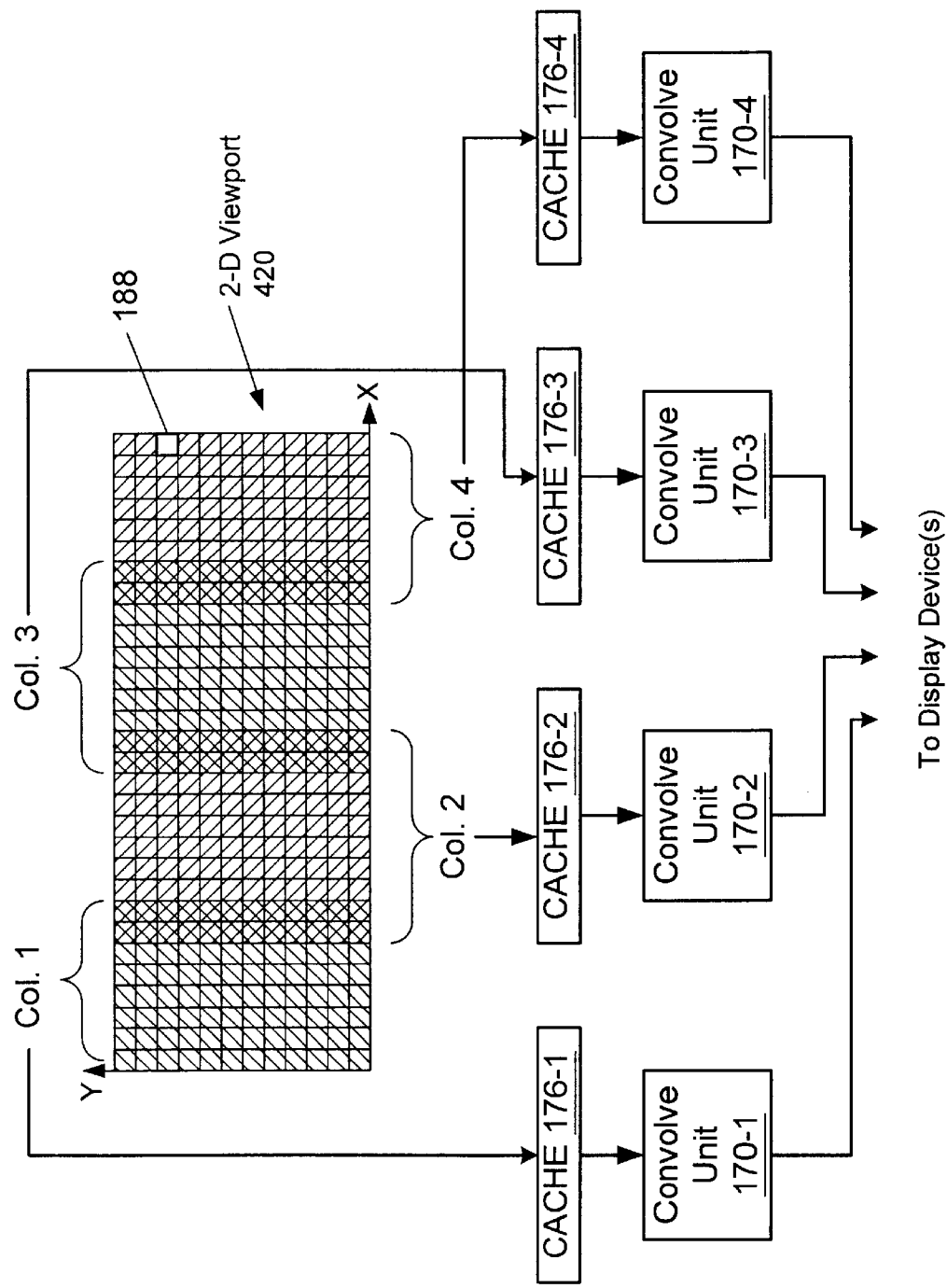
FIG. 11 illustrates a method of converting samples values to pixel values in parallel.

FIG. 11—Computing Pixels from Samples

As discussed earlier, the 2-D viewport may be covered with an array of spatial bins. Each spatial bin may be populated with samples whose positions are determined by sample position memory 354. Each spatial bin corresponds to a memory bin in sample buffer 162. A memory bin stores the sample values (e.g. red, green, blue, z, alpha, etc.) for the samples that reside in the corresponding spatial bin. Sample-to-pixel calculation units 170 (also referred to as convolve units 170) are configured to read memory bins from sample buffer 162 and to convert sample values contained within the memory bins into pixel values.

FIG. 11 illustrates one method for rapidly converting sample values stored in sample buffer 162 into pixel values. The spatial bins which cover the 2-D viewport may be organized into columns (e.g., Cols. 1–4). Each column comprises a two-dimensional subarray of spatial bins. The columns may be configured to horizontally overlap (e.g., by one or more spatial bins). Each of the sample-to-pixel calculation units 170-1 through 170-4 may be configured to access memory bins corresponding to one of the columns. For example, sample-to-pixel calculation unit 170-1 may be configured to access memory bins that correspond to the spatial bins of Column 1. The data pathways between sample buffer 162 and sample-to-pixel calculations unit 170 may be optimized to support this column-wise correspondence.

FIG. 11 shows four sample-to-pixel calculation units 170 for the sake of discussion. It is noted that graphics board GB(I) may include any number of the sample-to-pixel calculation units 170.

The amount of the overlap between columns may depend upon the horizontal diameter of the filter support for the filter kernel being used. The example shown in FIG. 11 illustrates an overlap of two bins. Each square (such as square 188) represents a single bin comprising one or more samples. Advantageously, this configuration may allow sample-to-pixel calculation units 170 to work independently and in parallel, with each of the sample-to-pixel calculation units 170 receiving and convolving samples residing in the memory bins of the corresponding column. Overlapping the columns will prevent visual bands or other artifacts from appearing at the column boundaries for any operators larger than a pixel in extent.

Furthermore, the embodiment of FIG. 11 may include a plurality of bin caches 176 which couple to sample buffer 162. In addition, each of bin caches 176 couples to a corresponding one of sample-to-pixel calculation units 170. Bin cache 176-I (where I takes any value from one to four) stores a collection of memory bins from Column I, and serves as a cache for sample-to-pixel calculation unit 170-I. Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 12A:
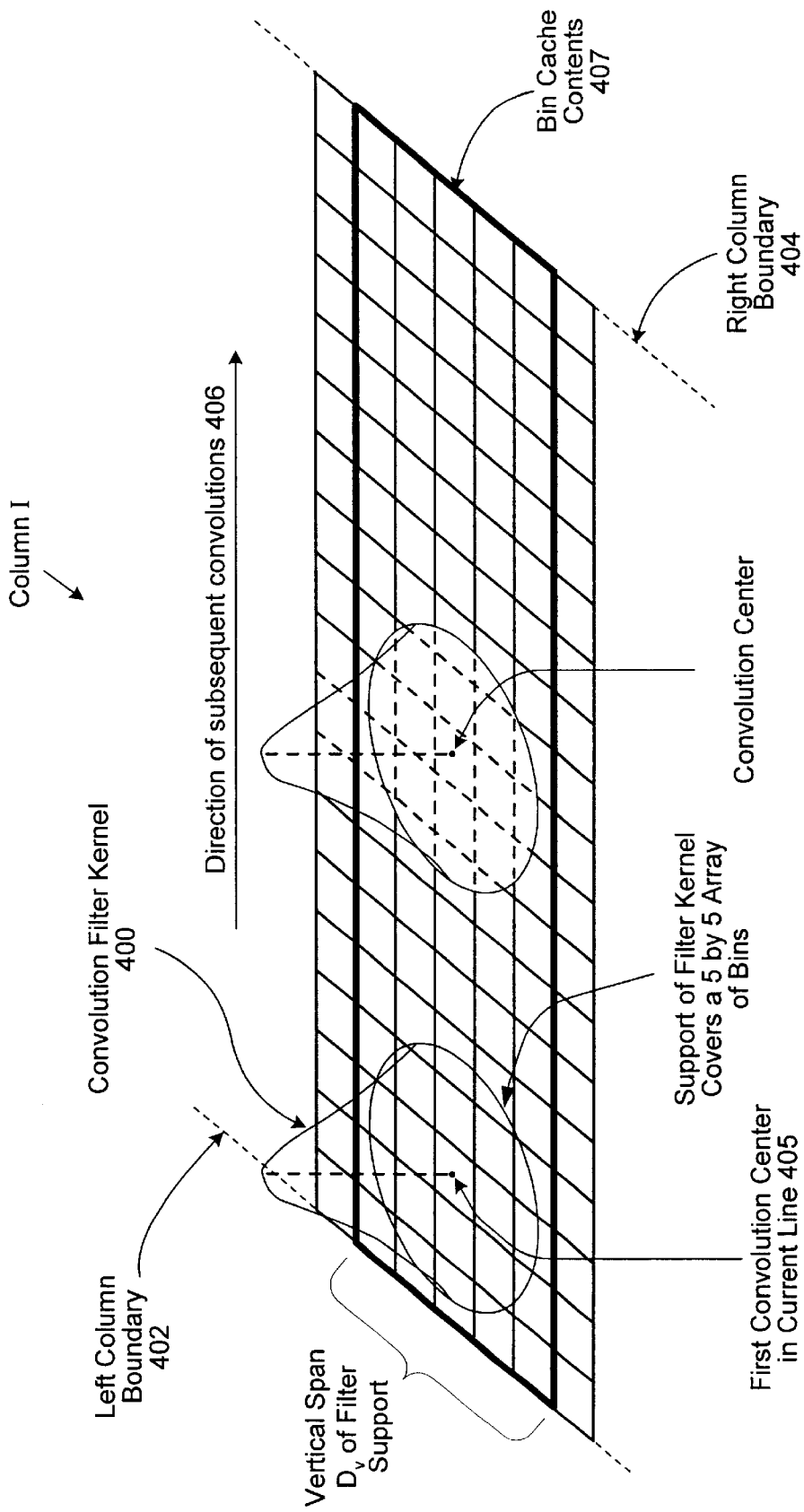
FIG. 12A illustrates the traversal of a filter kernel 400 across a generic Column I of FIG. 12.
Figure 12B:
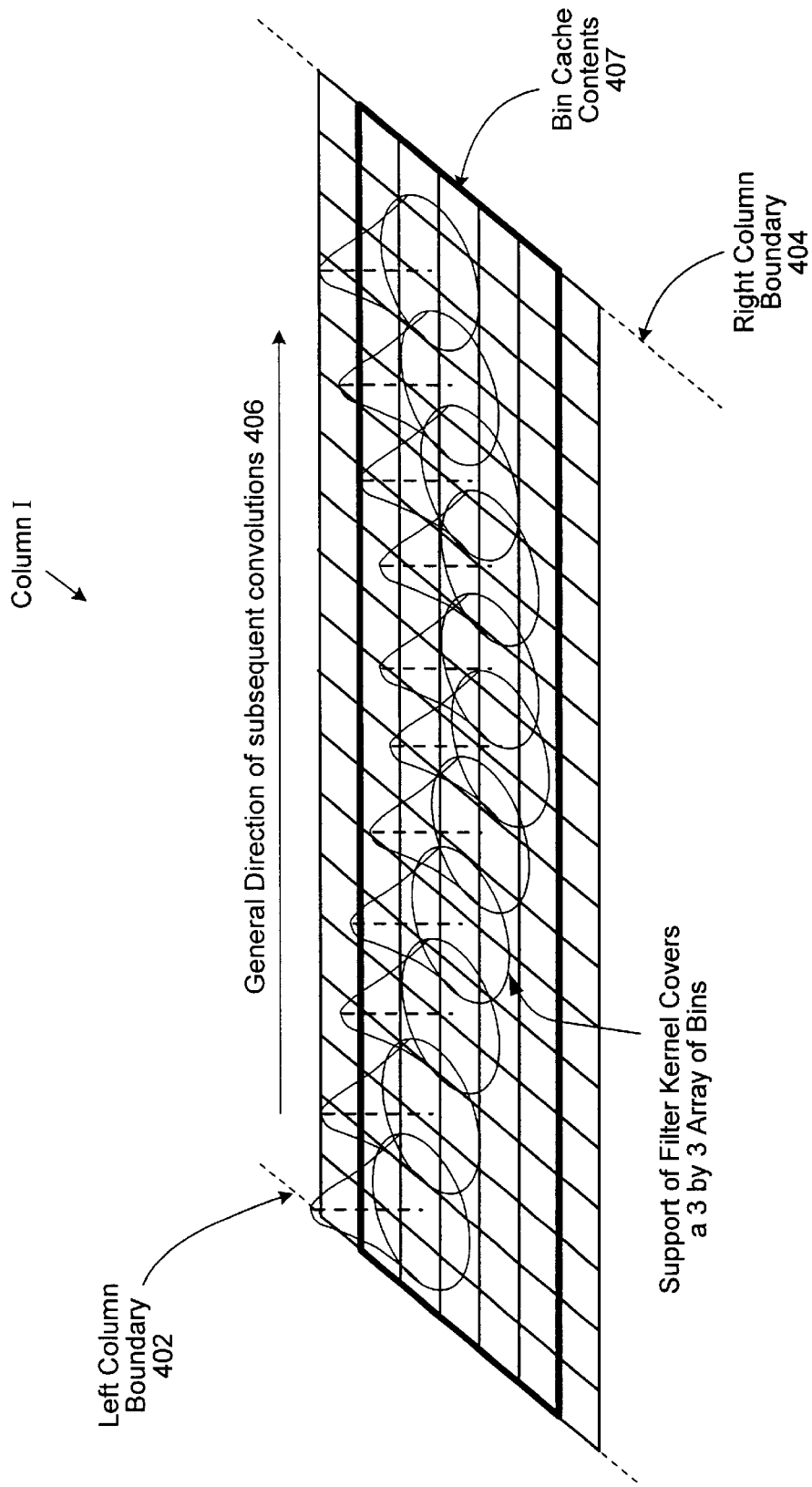
FIG. 12B illustrates a distorted traversal of filter kernel 400 across a generic Column I of FIG. 11.

FIG. 12A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit 170-I may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $D_L$ bin rows of memory bins. The cache line-depth parameter $D_L$ may be chosen to accommodate the support of filter kernel 400. If the support of filter kernel 400 is expected to span no more than $D_V$ bins vertically (i.e. in the Y direction), the cache line-depth parameter $D_L$ may be set equal to $D_V$ or larger.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

In one embodiment, the cache line-depth parameter $D_L$ is set equal to $D_V+1$. In the example of FIG. 12A, the filter support covers $D_V=5$ bins vertically. Thus, the cache line-depth parameter $D_L=6=5+1$. The additional bin row in bin cache 176-I allows the processing of memory bins (accessed from bin cache 176-I) to be more substantially out of synchronization with the loading of memory bins (into bin cache 176-I) than if the cache line-depth parameter $D_L$ were set at the theoretical minimum value $D_V$.

In one embodiment, sample buffer 162 and bin cache 176-I may be configured for row-oriented burst transfers. If a request for a memory bin misses in bin cache 176-I, the entire bin row containing the requested memory bin may be fetched from sample buffer 162 in a burst transfer. Thus, the first convolution of a scan line may fill the bin cache 176-I with all the memory bins necessary for all subsequent convolutions in the scan line. For example, in performing the first convolution in the current scan line at the first convolution center 405, sample-to-pixel calculation unit 170-I may assert a series of requests for memory bins, i.e. for the memory bins corresponding to those spatial bins (rendered in shade) which intersect the support of filter kernel 400. Because the filter support 400 intersects five bin rows, in a worst case scenario, five of these memory bin requests will miss bin cache 176-I and induce loading of all five bin rows from sample buffer 162. Thus, after the first convolution of the current scan line is complete, bin cache 176-I may contain the memory bins indicated by the heavily outlined rectangle 407. Memory bin requests asserted by all subsequent convolutions in the current scan line may hit in bin cache 176-I, and thus, may experience significantly decreased bin access time.

In general, the first convolution in a given scan line may experience fewer than the worst case number of misses to bin cache 176-I because bin cache 176-I may already contain some or all of the bin rows necessary for the current scan line. For example, if convolution centers are located at the center of each spatial bin, the vertical distance between successive scan lines (of convolution centers) corresponds to the distance between successive bin rows, and thus, the first convolution of a scan line may induce loading of a single bin row, the remaining four bin rows having already been loaded in bin cache 176-I in response to convolutions in previous scan lines.

If the successive convolution centers in a scan line are expected to depart from a purely horizontal trajectory across Column I, the cache line-depth parameter $D_L$ may be set to accommodate the maximum expected vertical deviation of the convolution centers. For example, in FIG. 12B, the convolution centers follow a curved path across Column I. The curved path deviates from a horizontal path by approximately two bins vertically. Since the support of the filter kernel covers a 3 by 3 array of spatial bins, bin cache 176-I may advantageously have a cache line-depth $D_L$ of at least five (i.e. two plus three).

As mentioned above, Columns 1 through 4 of the 2-D viewport may be configured to overlap horizontally. The size of the overlap between adjacent Columns may be configured to accommodate the maximum expected horizontal deviation of convolution centers from nominal convolution centers on a rectangular grid.

Figure 12C:
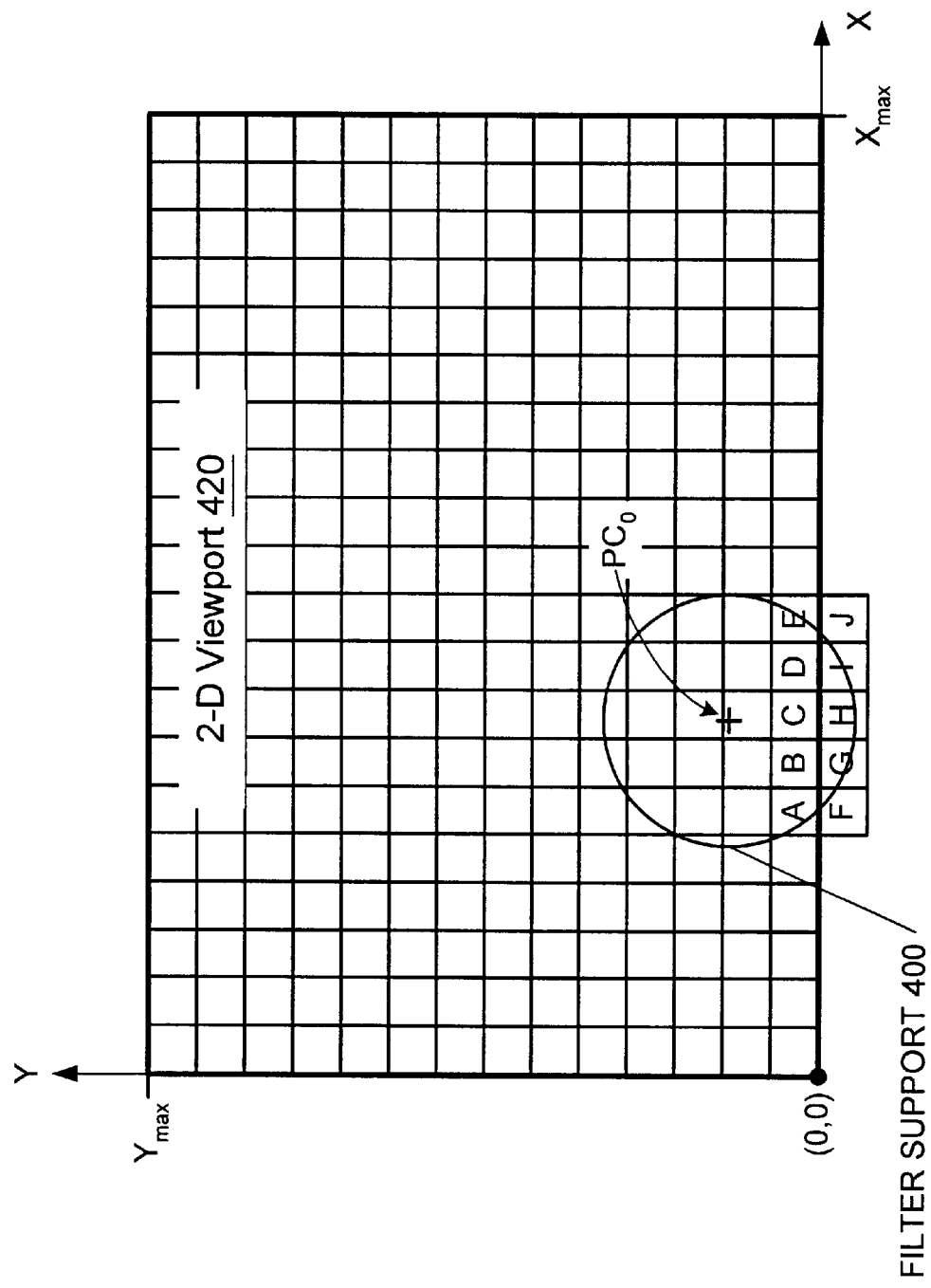
FIG. 12C illustrates one embodiment of a method for dealing with boundary conditions.

FIG. 12C illustrates potential border conditions in the computation of output pixel values. The 2-D viewport 420 is illustrated as a rectangle which is overlaid with a rectangular array of spatial bins. Recall that every spatial bin corresponds to a memory bin in sample buffer 162. The memory bin stores the sample values and/or sample positions for samples residing in the corresponding spatial bin. As described above, sample-to-pixel calculation units 170 filter samples in the neighborhood of a pixel center in order to generate output pixel values (e.g. red, green, blue, etc.). Pixel center $PC_0$ is close enough to the lower boundary (Y=0) of the 2-D viewport 420 that its filter support 400 is not entirely contained in the 2-D viewport. Sample-to-pixel calculation units 170 may generate sample positions and/or sample values for the marginal portion of filter support 400 (i.e. the portion which falls outside the 2-D viewport 420) according to a variety of methods.

In one embodiment, sample-to-pixel calculation units 170 may generate one or more dummy bins to cover the marginal area of the filter support 400. Sample positions for the dummy bins may be generated by reflecting the sample positions of spatial bins across the 2-D viewport boundary. For example, dummy bins F, G, H, I and J may be assigned sample positions by reflecting the sample positions corresponding to spatial bins A, B, C, D and E respectively across of the boundary line Y=0. The sample positions for dummy bins may also be generated by translating the sample positions corresponding to spatial bins across the viewport boundary, or perhaps, by generating sample positions on-the-fly according to a regular, a perturbed regular or stochastic sample positioning scheme.

Predetermined color values may be associated with these dummy samples in the dummy bins. For example, the value (0,0,0) for the RGB color vector may be assigned to each dummy sample. As pixel center $PC_0$ moves downward (i.e. toward the boundary Y=0 and through it), additional dummy bins with dummy samples may be generated to cover filter support 400 (which moves along with the pixel center $PC_0$). Within filter support 400, the number of dummy samples (having the background color) increases and the number of rendered samples (having arbitrary colors) decreases. When the filter support 400 has moved entirely outside of the 2-D viewport 420, filter support 400 is populated entirely with dummy samples. Thus, as pixel center $PC_0$ moves toward the boundary and through it, the color value computed with filter support 400 smoothly approaches the predetermined background color.

In one alternative embodiment, only samples which reside inside the 2-D viewport 420 (and inside the filter support 400) are allowed to contribute to the pixel's color computations, i.e. convolution sums. In other words, portions of filter support 400 which fall outside the 2-D viewport 420 may be ignored. As described later in connection with FIG. 15, the cumulative sums of weighted sample values are normalized by a cumulative sum of filter weights. This normalization compensates for the decreased number of samples which contribute to the cumulative sums at the boundary of the 2-D viewport 420.

Figure 12D:
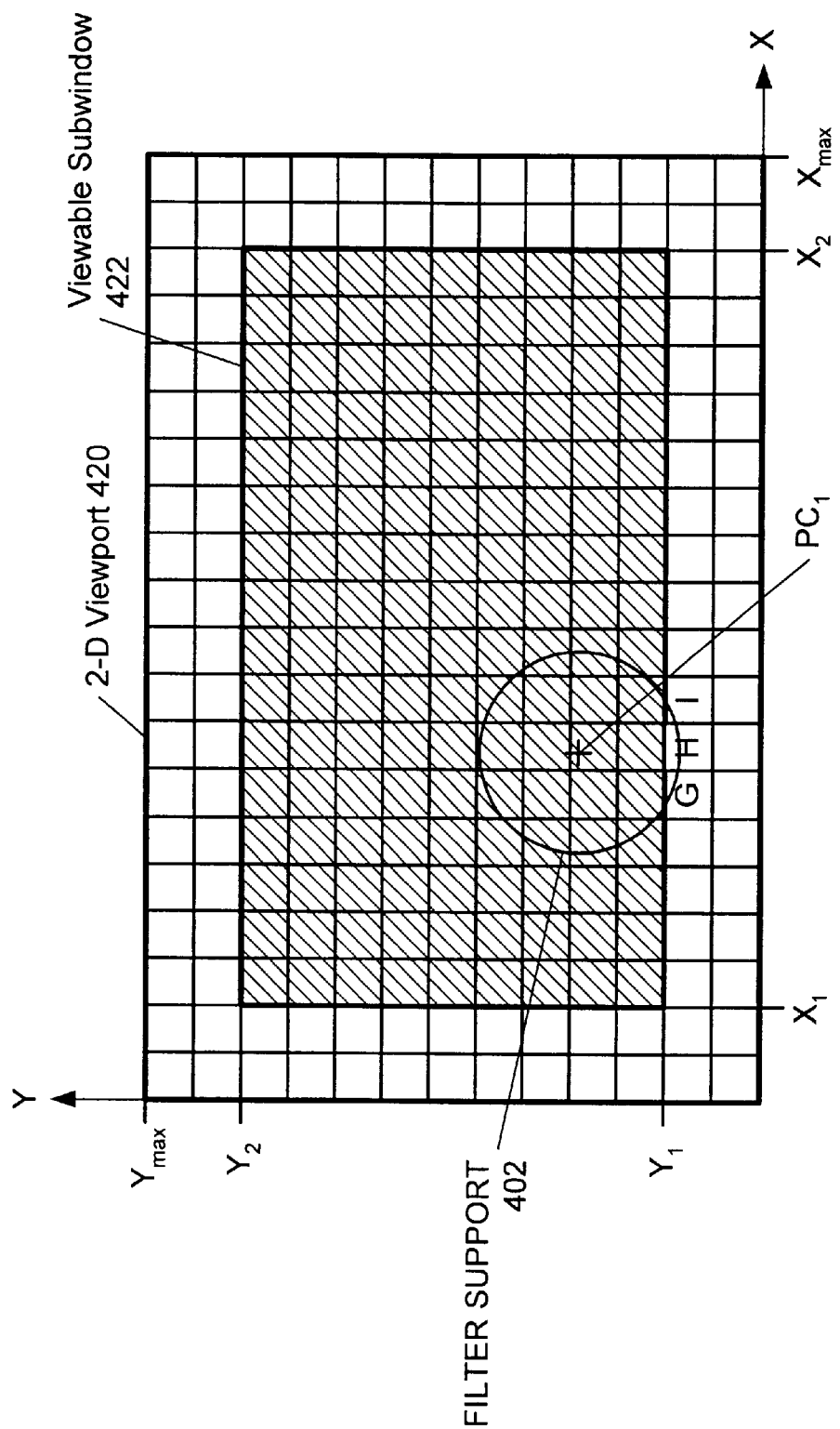
FIG. 12D illustrates an embodiment of a second method for dealing with boundary conditions.

FIG. 12D illustrates an alternate embodiment of a method for performing pixel value computations. Sample-to-pixel computation units 170 may perform pixel value computations using a viewable subwindow 422 of the 2-D viewport 420. The viewable subwindow is depicted as a rectangle with lower left corner at $(X_1,Y_1)$ and upper right corner at $(X_2,Y_2)$ in virtual screen space. Sample-to-pixel calculation units 170 are operable to compute a color value at a pixel center so that the color deviates from a background color depending on distance normal to the boundary of the viewable subwindow. Because sample position memory 354 generates sample positions for the entire 2-D viewport 420, it is not necessary to generate dummy sample positions when filter support 400 intersects the marginal area (i.e. the region outside the viewable subwindow 422 and inside the 2-D viewport 420). Instead, the samples positions already generated and stored in sample position memory 354 (or sample buffer 162) may be used in color computations. For example, filter support 402 located at pixel center $PC_1$ is close enough to the boundary of the viewable subwindow 402 that it intersects several spatial bins in the marginal area, i.e. spatial bins G, H and I. Sample positions in spatial bins G, H and I may be accessed from sample position memory (or sample buffer 162) to determine if they fall within filter support 402. The sample positions that do fall within filter support 402 contribute to the color computation as the background color. In particular, the rendered color values (stored in sample buffer 162) for these marginal sample positions are not used. Filter support 402 also intersects spatial bins interior to the viewable subwindow. The sample positions and corresponding rendered color values for these interior spatial bins are accessed from sample position memory and sample buffer 162 respectively. The sample positions which fall within filter support 402 contribute their corresponding rendered color values to the color computation. For filter support 402, the internal samples greatly outnumber the exterior sample positions. Thus, the color for pixel center $PC_1$ will be only slightly biased towards the background color. In general, as a pixel center approaches a boundary of the viewable subwindow 422 and moves through it, the relative number of marginal sample positions (which contribute as the background color) to interior sample positions which count according to the rendered color values decreases. Thus, the color smoothly transitions to the background color as the pixel center moves out of the viewable subwindow 422.

In another embodiment, samples outside the viewable subwindow 422 contribute their rendered color values instead of the background color values to the pixel value computations.

In one alternative embodiment, only samples inside the filter support 400 and inside the viewable subwindow 422 are allowed to contribute to a pixel's color computations, i.e. convolution sums. In other words, samples outside the viewable subwindow 422 are not used in the computation of color values.

Figure 13:
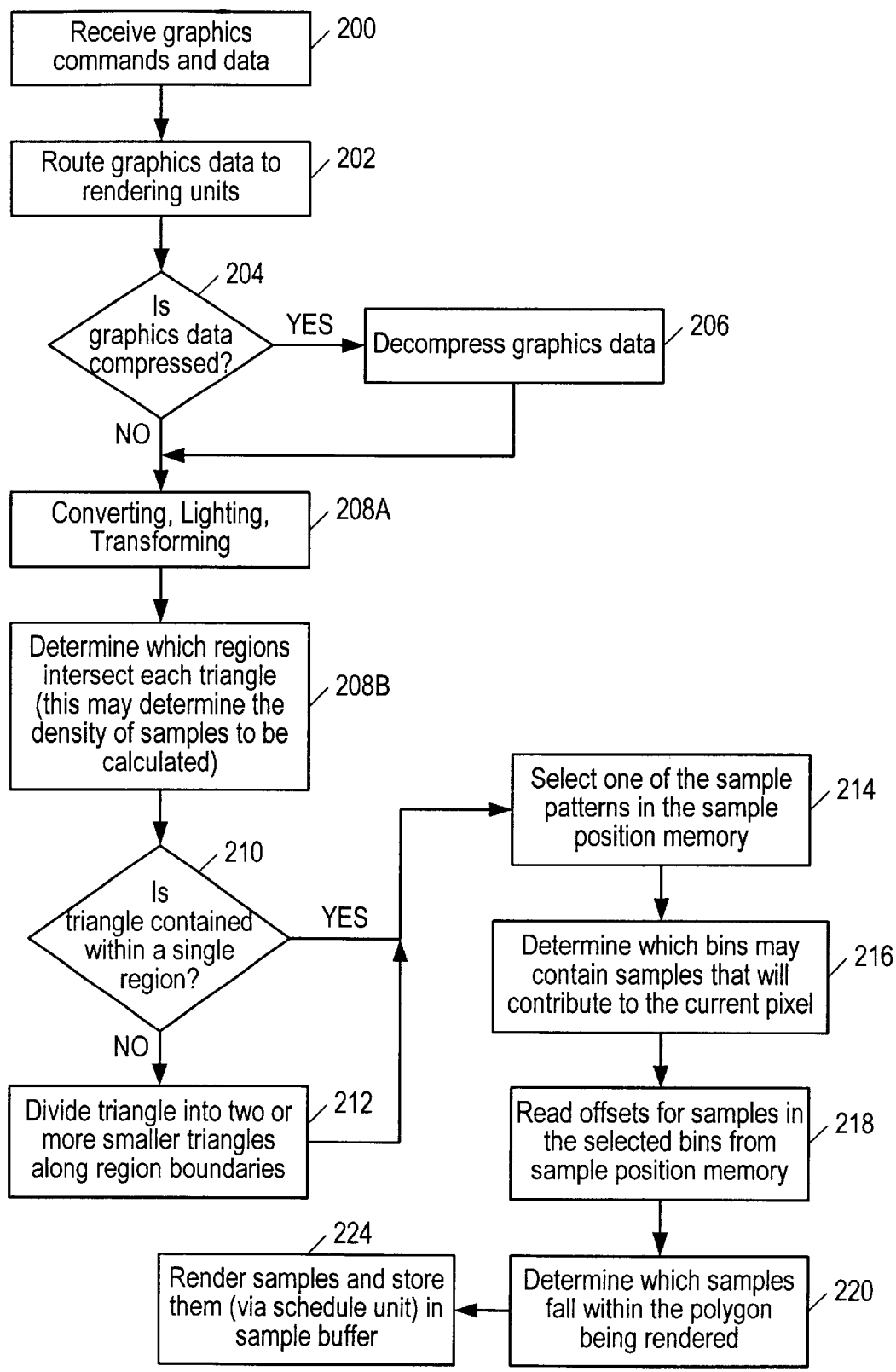
FIG. 13 is a flowchart illustrating one embodiment of a method for drawing samples into a super-sampled sample buffer.

FIG. 13—Rendering Samples into a Super-sampled Sample Buffer

FIG. 13 is a flowchart of one embodiment of a method for drawing or rendering samples into a super-sampled sample buffer. Certain of the steps of FIG. 13 may occur concurrently or in different orders. In step 200, graphics board GB(I) receives graphics commands and graphics data from the host CPU 102 or directly from system memory 106. In step 202, the instructions and data are routed to one or more of rendering units 150A–D. In step 204, rendering units 150A–D determine if the graphics data is compressed. If the graphics data is compressed, rendering units 150A–D decompress the graphics data into a useable format, e.g., triangles, as shown in step 206. Next, the triangles are processed and converted to an appropriate space for lighting and clipping prior to the perspective divide and transform to screen space (as indicated in step 208A).

If the graphics system implements variable resolution super-sampling, then the triangles are compared with a set of sample-density region boundaries (step 208B). In variable-resolution super-sampling, different regions of the 2-D viewport may be allocated different sample densities based upon a number of factors (e.g., the center of the attention of an observer on projection screen SCR as determined by eye or head tracking). If the triangle crosses a sample-density region boundary (step 210), then the triangle may be divided into two smaller polygons along the region boundary (step 212). The polygons may be further subdivided into triangles if necessary (since the generic slicing of a triangle gives a triangle and a quadrilateral). Thus, each newly formed triangle may be assigned a single sample density. In one embodiment, graphics system 112 may be configured to render the original triangle twice, i.e. once with each sample density, and then, to clip the two versions to fit into the two respective sample density regions.

In step 214, one of the sample positioning schemes (e.g., regular, perturbed regular, or stochastic) is selected from sample position memory 354. The sample positioning scheme will generally have been pre-programmed into the sample position memory 354, but may also be selected "on the fly". In step 216, rendering units 150A–D may determine which spatial bins contain samples located within the triangle's boundaries, based upon the selected sample positioning scheme and the size and shape of the spatial bins. In step 218, the offsets dX and dY for the samples within these spatial bins are then read from sample position memory 354. In step 220, each sample's position is then calculated using the offsets dX and dY and the coordinates of the corresponding bin origin, and is compared with the triangle's vertices to determine if the sample is within the triangle. Step 220 is discussed in greater detail below.

For each sample that is determined to be within the triangle, the rendering unit draws the sample by calculating the sample's color, alpha and other attributes. This may involve a lighting calculation and an interpolation based upon the color and texture map information associated with the vertices of the triangle. Once the sample is rendered, it may be forwarded to schedule unit 154, which then stores the sample in sample buffer 162 (as indicated in step 224).

Note the embodiment of the rendering method described above is used for explanatory purposes only and is not meant to be limiting. For example, in some embodiments, the steps shown in FIG. 13 as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Determination of Which Samples Reside Within the Polygon being Rendered

Figure 14:
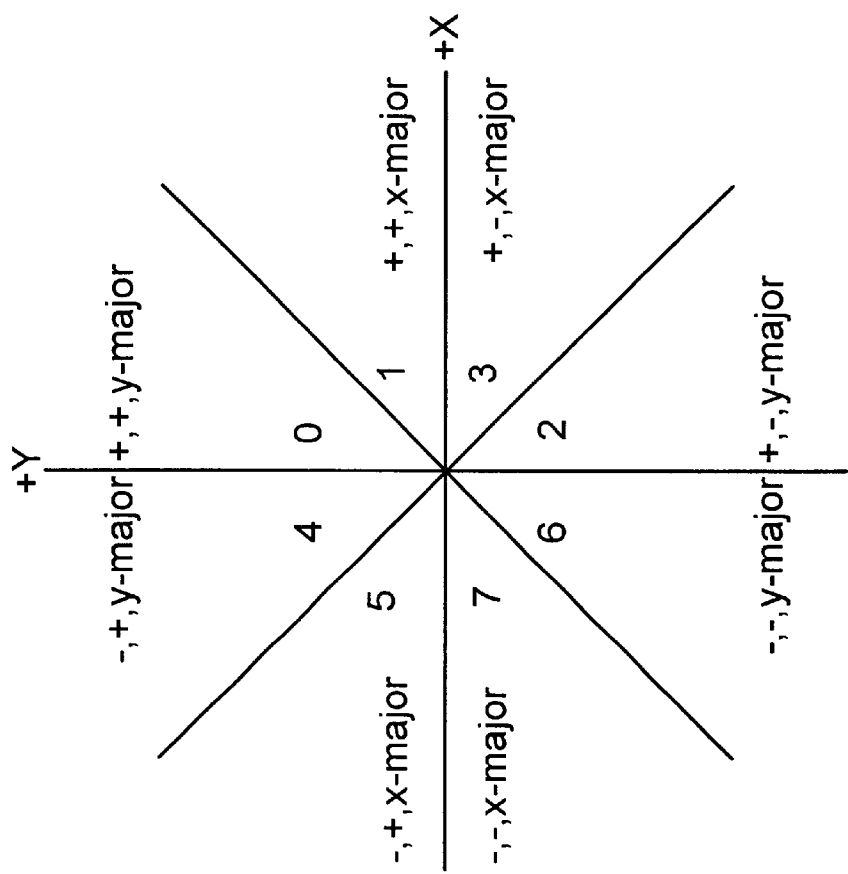
FIG. 14 illustrates one embodiment for coding triangle vertices.

The determination of which samples reside within the polygon being rendered may be performed in a number of different ways. In one embodiment, the deltas between the three vertices defining the triangle are first determined. For example, these deltas may be taken in the order of first to second vertex (v2−v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y components). A third condition may be added determining whether the vector is an X-major vector or Y-major vector. This may be determined by calculating whether abs(delta_x) is greater than abs(delta_y). Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 14.

Next, three edge inequalities may be used to define the interior of the triangle. The edges themselves may be described as lines in the either (or both) of the forms y=mx+b or x=ry+c, where rm=1. To reduce the numerical range needed to express the slope, either the X-major and Y-major equation form for an edge equation may be used (so that the absolute value of the slope may be in the range of 0 to 1). Thus, the edge (or half-plane) inequalities may be expressed in either of two corresponding forms:

X-major: $y-m \cdot x-b<0$, when point (x,y) is below the edge;

Y-major: $x-r \cdot y-c<0$, when point (x,y) is to the left of the edge.

The X-major inequality produces a logical true value (i.e. sign bit equal to one) when the point in question (x,y) is below the line defined by the an edge. The Y-major equation produces a logical true value when the point in question (x,y) is to the left of the line defined by an edge. The side which comprises the interior of the triangle is known for each of the linear inequalities, and may be specified by a Boolean variable referred to herein as the accept bit. Thus, a sample (x,y) is on the interior side of an edge if X-major: $(y-m \cdot x-b<0)$<xor> accept=true;

Y-major: $(x-m \cdot y-b<0)$<xor> accept=true.

The accept bit for a given edge may be calculated according to the following table based on (a) the region (zero through seven) in which the edge delta vector resides, and (b) the sense of edge traversal, where clockwise traversal is indicated by cw=1 and counter-clockwise traversal is indicated by cw=0. The notation "!" denotes the logical complement.

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge inequality to the third vertex of the triangle (i.e. the vertex that is not one of the two vertices forming the edge). This method may incur the additional cost of a multiply-add, which may be avoided by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no samples to render. One special case arises when a triangle splits the view plane. However, this case may be detected earlier in the pipeline (e.g., when front plane and back plane clipping are performed).

Note in most cases only one side of a triangle is rendered. Thus, if the faced-ness of a triangle determined by the analysis above is the one to be rejected, then the triangle can be culled (i.e., subject to no further processing with no samples generated). Further note that this determination of faced-ness only uses one additional comparison (i.e., of the slope of edge12 to that of edge23) beyond factors already computed. Many traditional approaches may utilize more complex computations (though at earlier stages of the set-up computation).

Figure 15:
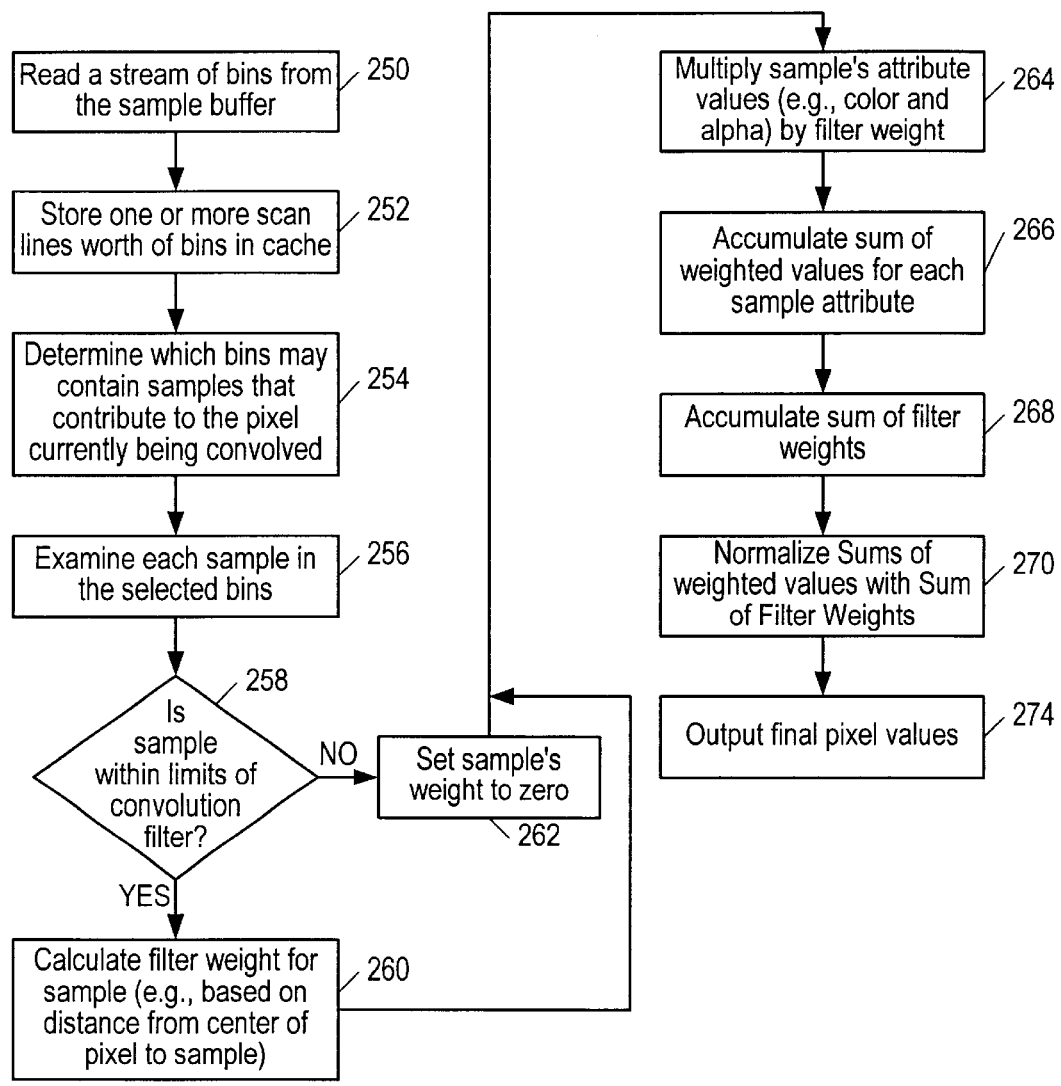
FIG. 15 illustrates one embodiment of a method for calculating pixel values from sample values.

FIG. 15—Generating Output Pixels Values from Sample Values

FIG. 15 is a flowchart of one embodiment of a method for selecting and filtering samples stored in super-sampled sample buffer 162 to generate output pixel values. In step 250, a stream of memory bins are read from the super-sampled sample buffer 162. In step 252, these memory bins may be stored in one or more of bin caches 176 to allow the sample-to-pixel calculation units 170 easy access to sample values during the convolution operation. In step 254, the memory bins are examined to determine which of the memory bins may contain samples that contribute to the output pixel value currently being generated. The support (i.e. footprint) of the filter kernel 400 (see FIG. 12A) intersects a collection of spatial bins. The memory bins corresponding to these samples may contain sample values that contribute to the current output pixel.

Each sample in the selected bins (i.e. bins that have been identified in step 254) is then individually examined to determine if the sample does indeed contribute (as indicated in steps 256–258). This determination may be based upon the distance from the sample to the center of the output pixel being generated.

In one embodiment, the sample-to-pixel calculation units 170 may be configured to calculate this sample distance (i.e., the distance of the sample from the filter center) and then use it to index into a table storing filter weight values (as indicated in step 260). In another embodiment, however, the potentially expensive calculation for determining the distance from the center of the pixel to the sample (which typically involves a square root function) may be avoided by using distance squared to index into the table of filter weights. In one embodiment, this squared-distance indexing scheme may be facilitated by using a floating point format for the distance (e.g., four or five bits of mantissa and three bits of exponent), thereby allowing much of the accuracy to be maintained while compensating for the increased range in values. In one embodiment, the table of filter weights may be implemented in ROM. However, RAM tables may also be used. Advantageously, RAM tables may, in some embodiments, allow the graphics system to vary the filter coefficients on a per-frame or per-session basis. For example, the filter coefficients may be varied to compensate for known shortcomings of the display/projection device or for the user's personal preferences. The graphics system can also vary the filter coefficients on a screen area basis within a frame, or on a per-output pixel basis. Another alternative embodiment may calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

In one alternative embodiment, the filter kernel may not be expressible as a function of distance with respect to the filter center. For example, a pyramidal tent filter is not expressible as a function of distance from the filter center. Thus, filter weights may be tabulated (or computed) in terms of X and Y sample-displacements with respect to the filter center.

Once the filter weight for a sample has been determined, the attribute values (e.g. red, green, blue, alpha, etc.) for the sample may then be multiplied by the filter weight (as indicated in step 264). Each of the weighted attribute values may then be added to a corresponding cumulative sum—one cumulative sum for each attribute—as indicated in step 266. The filter weight itself may be added to a cumulative sum of filter weights (as indicated in step 268). After all samples residing in the support of the filter have been processed, the cumulative sums of the weighted attribute values may be divided by the cumulative sum of filter weights (as indicated in step 270). It is noted that the number of samples which fall within the filter support may vary as the filter center moves within the 2-D viewport. The normalization step 270 compensates for the variable gain which is introduced by this nonuniformity in the number of included samples, and thus, prevents the computed pixel values from appearing too bright or too dark due to the sample number variation. Finally, the normalized output pixels may be output for gamma correction, digital-to-analog conversion (if necessary), and eventual display (step 274).

Figure 16:
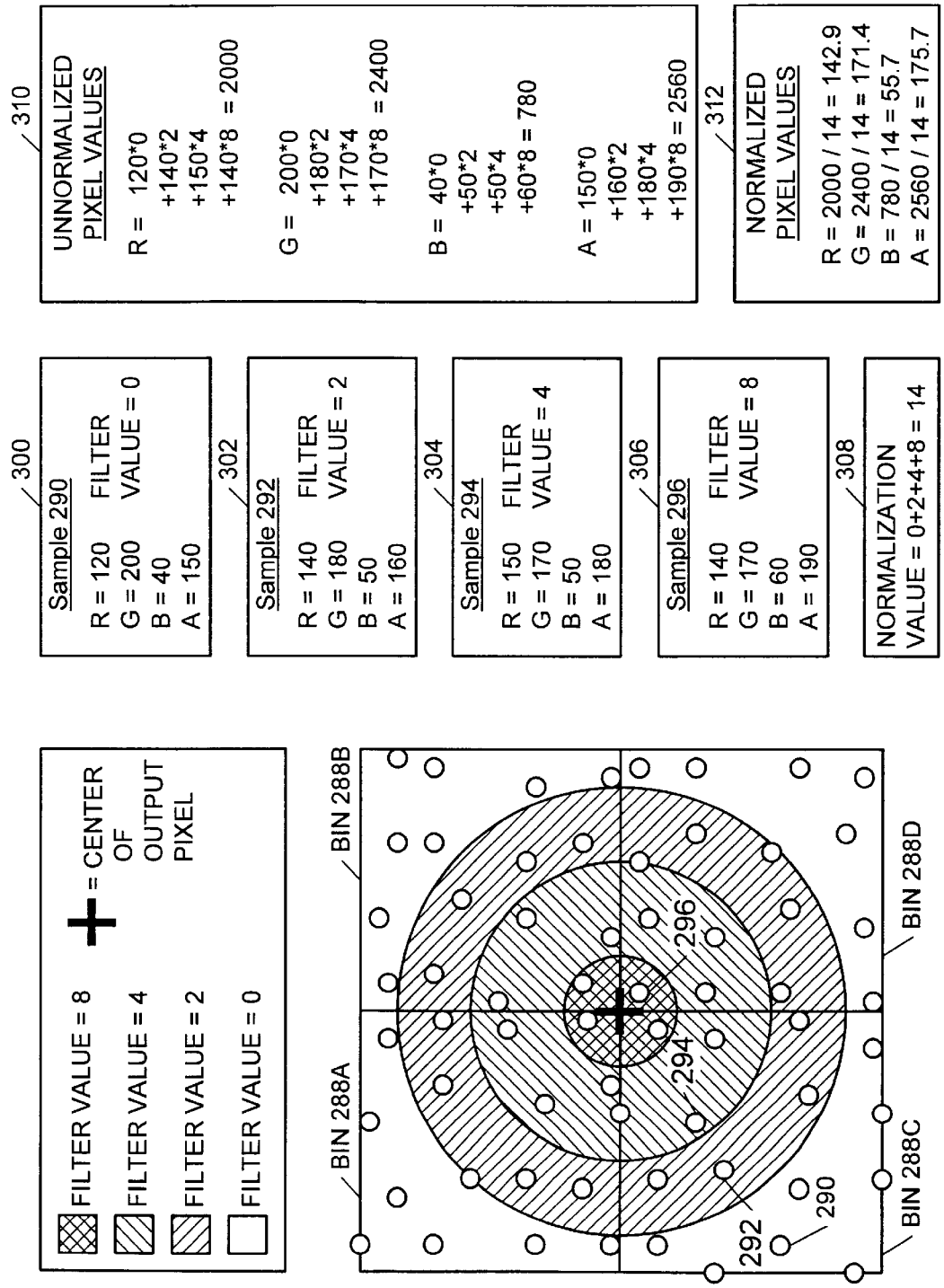
FIG. 16 illustrates details of one embodiment of a convolution for an example set of samples at a virtual pixel center in the 2-D viewport.

FIG. 16—Example Output Pixel Convolution

FIG. 16 illustrates a simplified example of an output pixel convolution with a filter kernel which is radially symmetric and piecewise constant. As the figure shows, four bins 288A–D contain samples that may possibly contribute to the output pixel convolution. In this example, the center of the output pixel is located at the shared corner of bins 288A–288D. Each bin comprises sixteen samples, and an array of four bins (2×2) is filtered to generate the attribute values (red, green, blue, alpha) for the output pixel. Since the filter kernel is radially symmetric, the distance of each sample from the pixel center determines the filter value which will be applied to the sample. For example, sample 296 is relatively close to the pixel center, and thus falls within the region of the filter having a filter value of 8.

Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed attribute values for the output pixel. Because the filter kernel is a decreasing function of distance from the pixel center, samples close to the pixel center contribute more to the computed attribute values than samples farther from the pixel center. This type of filtering may be used to perform image smoothing or anti-aliasing.

Example attribute values for samples 290–296 are illustrated in boxes 300–306. In this example, each sample comprises red, green, blue and alpha values, in addition to the sample's positional data. Block 310 illustrates the calculation of each pixel attribute value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel attribute values.

The filter presented in FIG. 16 has been chosen for descriptive purposes only and is not meant to be limiting. A wide variety of filters may be used for pixel value computations depending upon the desired filtering effect(s), e.g., filters such as the box filter, the tent filter, the cylinder filter, the cone filter, the Gaussian filter, the Catmull-Rom filter, the Mitchell-Netravali filter, the windowed sinc filter, or in general, any form of bandpass filter or any of various windowed approximations to the sinc filter. Furthermore, the support of the filters used for the pixel value convolutions may be circular, elliptical, rectangular (e.g. square), triangular, hexagonal, etc.

It is a well known fact that the sinc filter realizes an ideal band-pass filter. However, the sinc filter takes non-zero values over the whole of the X-Y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Catmull-Rom filter are obtained by approximating some of the negative lobes and positive lobes which surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

The piecewise constant filter function shown in FIG. 16 with four constant regions is not meant to be limiting. For example, in one embodiment the convolution filter may have a large number of regions each with an assigned filter value (which may be positive, negative and/or zero). In another embodiment, the convolution filter may be a continuous function that is evaluated for each sample based on the sample's distance (or X and Y displacements) from the pixel center. Also note that floating point values may be used for increased precision.

Full-screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically distributing up to sixteen samples per output pixel in 2-D viewport 420, and filtering the samples with a 5×5 convolution filter (i.e. a filter which covers a 5 by 5 area measured in pixel units).

Notation for Data Operands

The notation X(sY.Z) is used herein to denote an X-bit quantity, where the X bits include: one sign bit, Y bits before the binary point, and Z bits after the binary point. Thus X=1+Y+Z. The notation X(s.Z) indicates an X-bit quantity, where the X bits include: one sign bit, and Z bits after the binary point. The notation X(sg.Y) denotes an X-bit quantity, where the X bits include: one sign bit, one guard bit, Y bits after the binary point.

Spatial Dithering of Color Samples

Figure 17:
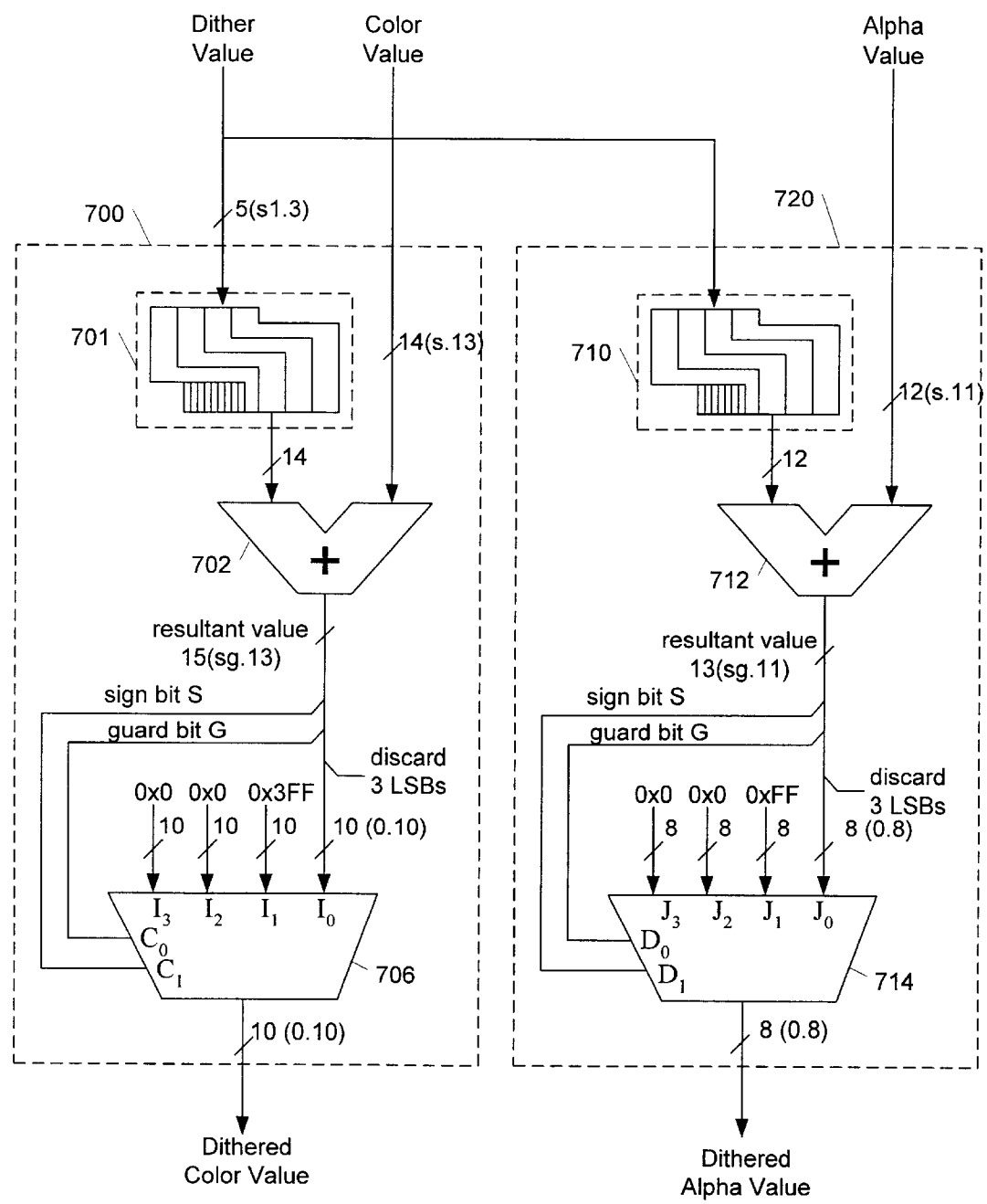
FIG. 17 illustrates a color dither unit 700 and an alpha dither unit 720.

In one embodiment, graphics board GB(I) comprises a dither unit 700 as shown in FIG. 17. Dither unit 700 may be comprised within one or more of rendering units 150. Dither unit 700 comprises adder 702 and multiplexor 706. Dither unit 700 receives a sequence of N color values (e.g. red values) corresponding to the samples in a bin prior to their storage into sample buffer 162. For example, N may equal sixteen. The color values may be 14(s.13) quantities.

Dither unit 700 also receives a sequence of N dither values. The N dither values may be configured to have an average value of ½ (or approximately ½). In some embodiments, the N dither values may approximate a uniform distribution of numbers between ½−A and ½+A, where A is a rational number greater than or equal to one. The dither radius A may be programmable. In one particular embodiment, A equals one. The dither values may be 5(s1.3) quantities. The dither values may be sign extended to fourteen bits in anticipation of adding the dither values to the 14-bit color values. The sign extension may be efficiently implemented by hardwired pathways as suggested by connectivity pattern 701. Connectivity pattern 701 includes hardwired electrical pathways which (a) replicate the most significant bit, i.e. the sign bit, of the 5-bit input word to the ten most significant bits of the 14-bit output word, and (b) copy the four low order bits of the input word to the four lower order bits of the output word. The sign-extended dither values may be interpreted as having the form 14(s.13).

Adder 702 receives each color value $X_i$ and the corresponding sign-extended dither value $D_i$, and computes the sum $D_i+X_i$. In one embodiment, adder 702 provides the sum as a resultant value with the form 15(sg.13). If the sum is greater than one, adder 702 sets the guard bit of the resultant value to one. If the sum is negative, adder 702 sets the sign bit of the resultant value to one.

Multiplexor 706 includes data inputs I0 through I3, control inputs C0 and C1, and a single output. In one embodiment, each of the multiplexor inputs comprises 10 bits. Similarly, the multiplexor output may comprise 10 bits. The guard bit G of the resultant value is supplied to the control input C0. The sign bit S of the resultant value is supplied to the control input C1. The 3 least significant bits of the resultant value are discarded. The ten most significant bits of the resultant value after the binary point are supplied to input I0 of multiplexor 706. Input I1 is driven with the 10-bit value 0x3FF. Input I2 is driven with the 10-bit value 0x000. Input I3 is driven with the 10-bit value 0x000. Multiplexor 706 couples one of the four inputs I0 through I3 to the output based on the following control table. Other configurations are also possible and contemplated.

TABLE

Control Table for Multiplexor 706

| $C_1 = S$ | $C_0 = G$ | Action | Effect |
|---|---|---|---|
| 0 | 0 | Couple I0 to Output | Transmit Sum |
| 0 | 1 | Couple I1 to Output | Clamp to MAX |
| 1 | 0 | Couple I2 to Output | Clamp to Zero |
| 1 | 1 | Couple I3 to Output | Clamp to Zero |

If the sign bit S is set, multiplexor 706 couples either input 12 or input 13 to the output. In other words, if the resultant value is negative, the multiplexor output is clamped to zero. If the guard bit G is set while the sign bit S is clear, multiplexor 706 couples input I1 to the output. In other words, if the adder generated a value greater than one, the multiplexor output is clamped to the most positive value (i.e. "all ones"=0x3FF). If neither the guard bit nor the sign bit are set, the 10 MSBs (after the binary point) of the resultant value are transmitted to the multiplexor output.

An output value presented at the multiplexor output is referred to herein as a dithered color value. Adder 702 generates a stream of resultant values in response to the sequence of dither values and sequence of color values. Similarly, multiplexor 706 generates a stream of dithered color values in response to the stream of resultant values. In one embodiment, the stream of dithered color values may be interpreted as 10(0.10) quantities, i.e. 10 bit unsigned quantities with all 10 bits following the binary point. The sequence of dithered color values generated at the multiplexor output may be stored in sample buffer 162. In one embodiment, sample buffer 162 may have 10 bits of storage per color per sample. This motivates the action of discarding the 3 LSBs of the resultant value.

Graphics board GB(I) may include dither units 700-1, 700-2 and 700-3 similar to dither unit 700 for dithering respectively red values, green values, and blue values for the samples in a bin. The three dither units may dither the three colors in parallel. Alternatively, dither unit 700 may perform dithering for all three colors in a time-shared fashion. For example, in a first time period, dither unit 700 may dither the red values for the samples in a given bin. In a second time period, dither unit 700 may dither the green values for the same samples in the bin. In a third time period, dither unit 700 may dither the blue values for the same samples in the bin. After the third time period, dither unit 700 may advance to a next bin. Thus, the dither unit 700 may be used as a time-shared (i.e. multiplexed) resource.

The N dither values may be used repeatedly for successive bins. The dither values may be accessed from a dither lookup table.

Spatial Dithering of Alpha Values

Dithering may be applied to the alpha values in a similar way. In one embodiment, a separate dither unit 720 is used to dither alpha values as shown in FIG. 17. Dither unit 720 comprises adder 712 and multiplexor 714. Dither unit 720 receives a sequence of N alpha values corresponding to the samples in a bin prior to their storage into sample buffer 162. For example, N may equal sixteen. The alpha values may be 12(s.11) quantities. Dither unit 720 may receive the N alpha values while dither unit 700 concurrently receives the N color values for the same samples in the same bin.

Dither unit 720 may be configured to receive the same sequence of N dither values received by dither unit 700. The dither values, as originally presented to dither unit 720, may be 5(s1.3) quantities. The dither values may be sign-extended to twelve bits. The sign extension may be efficiently implemented by hardwired pathways as suggested by connectivity pattern 710. A sign-extended dither value may be interpreted as having the form 12(s.11).

Adder 712 receives each alpha value $A_i$ and the corresponding sign-extended dither value $d_i$, and computes the sum $d_i+A_i$. Adder 712 may provide the sum as a resultant value with the form 13(sg.11). If the sum is greater than one, adder 712 sets the guard bit of the resultant value to one. If the sum is negative, adder 712 sets the sign bit of the resultant value to one.

In one embodiment, multiplexor 714 includes data inputs J0 through J3, control inputs D0 and D1, and a single output. Each of the multiplexor inputs comprises 8 bits. Similarly, the multiplexor output comprises 8 bits. The guard bit G of the resultant value is supplied to the control input D0. The sign bit S of the resultant value is supplied to the control input D1. The 3 least significant bits of the resultant value are discarded. The eight most significant bits of the resultant value after the binary point are supplied to input J0 of the multiplexor 714. Input J1 is driven with the value 0xFF. Input J2 is driven with value 0x00. Input J3 is driven with the value 0x00. Multiplexor 714 couples one of the four inputs J0 through J3 to the output based on the following control table.

TABLE

Control Table for Multiplexor 714

| $D_1 = S$ | $D_0 = G$ | Action | Effect |
|---|---|---|---|
| 0 | 0 | Couple J0 to Output | Transmit Sum |
| 0 | 1 | Couple J1 to Output | Clamp to MAX |
| 1 | 0 | Couple J2 to Output | Clamp to Zero |
| 1 | 1 | Couple J3 to Output | Clamp to Zero |

If the sign bit S is set, multiplexor 714 couples either input J2 or input J3 to the output. In other words, if the resultant value is negative, the multiplexor output is clamped to zero. If the guard bit G is set while the sign bit S is clear, multiplexor 714 couples input J1 to the output. In other words, if the adder 712 generated a value greater than one, the multiplexor output is clamped to the most positive value (i.e. all ones=0xFF). If neither the guard bit nor the sign bit are set, the 8 MSBs (after the binary point) of the resultant value, are transmitted to the multiplexor output. Other configurations are also contemplated.

An output value presented at the output of multiplexor 714 is referred to herein as a dithered alpha value. Adder 712 generates a stream of resultant values in response to the sequence of sign-extended dither values di and the sequence of alpha values $A_i$. Similarly, multiplexor 714 generates a stream of dithered alpha values in response to the stream of resultant values. The stream of dithered alpha values may be interpreted as 8(0.8) quantities, i.e. 8 bit unsigned quantities with all 8 bits following the binary point. The sequence of dithered alpha values generated at the multiplexor output may be stored in sample buffer 162. Sample buffer 162 may have 8 bits of storage for the alpha component of each sample. This motivates the action of discarding the 3 LSBs of the resultant values.

In an alternative embodiment, the dithering of color values and/or alpha values may be performed by programmable hardware (e.g. a DSP core) instead of in dedicated hardware as described above.

FIG. 18—Tabulated Example

FIG. 18 presents a tabulated example of the dithering performed by one embodiment of dither unit 700 (and/or dither unit 720). Suppose that dither unit 700 receives a collection of 16 color values corresponding to a bin. The color values are denoted $X_i$ where the sample index i runs from zero to fifteen. The 14(s.13) color values are scaled up by $2^{10}$ so that the 3 LSBs (which are to be truncated) of each color value may be shown as a fraction. Dither unit 700 also receives a collection of 16 dither values. The dither values $D_i$ are chosen to have an average value of ½ approximately. The sum of each color value $X_i$ and the corresponding dither values $D_i$ is presented in the column denoted $S_i$. Column $Trn(S_i)$ shows the truncation of each sum, i.e., the last three bits of each sum $S_i$ are discarded. Column $Trn(X_i+½)$ shows the rounding of the color values without dithering. The rounding is implemented by adding ½ and then truncating.

Observe that the total of the color values $X_i$ is 147.125, and the total of the truncated sums $Trn(S_i)$ is 147. In contrast, the total of the rounded color values $Trn(X_i+½)$ is 144. Thus, dithering may allow the average of the color values to survive truncation where simple rounding may not. It is noted that the advantages of dithering may be more pronounced when the original sample values $X_i$ are tightly clustered about their average value.

In some embodiments, dithering may be optional. For example, by loading the dither lookup table with the value zero, dither unit 700 may implement a truncation of the color values. Alternatively, by loading the dither lookup table with all values ½, dither unit 700 may implement a rounding of color values.

Dealing with a Non-ideal Set of Dither Values

In the example above, the average of the dither values was 7/16, i.e. not exactly ½. Given a first set D of dither values $D_i$ having an average value of ½+epsilon, it is possible to construct a complementary set C of dither values $C_i$ having an average value of ½-epsilon by reflection about ½. In other words, for each dither value $D_i$ in the first set, construct a complementary dither value according to the relation $C_i=1-D_i$. If the samples in a first bin are dithered with the first set D of dither values, and samples from a second adjacent bin are dithered with the complementary set of dither values, then the two sets of dither values together will have an average value of ½ as desired.

Figure 19:
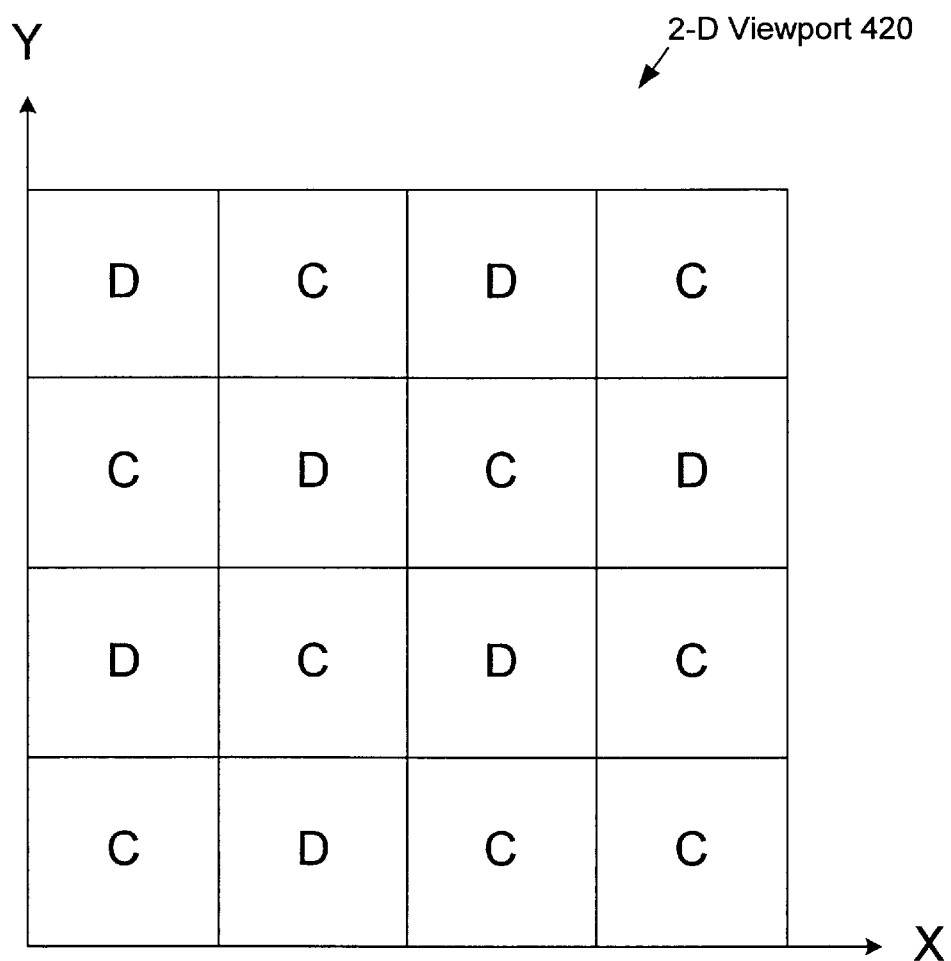
FIG. 19 presents a checkboard scheme for alternating dithering sets with respect to spatial bins in the 2-D viewport 420.

Dither unit 700 (and/or dither unit 720) may operate on bins with the first set D or the second complementary set C in a checkerboard as shown in FIG. 19. Thus, any two horizontally or vertically adjacent bins in the 2-D viewport 420 may be dithered so that one bin uses the first set D and the other bin uses the complementary set C.

Pixel Value Computations

As described extensively above, sample-to-pixel calculation units 170 compute pixel values by filtering the 10-bit samples (e.g. red, green, blue or alpha samples) obtained from sample buffer 162. In particular, generic sample-to-pixel calculation unit 170-I generates a pixel value by computing a weighted average of samples localized at a virtual pixel center (X,Y) in the 2-D viewport 420. (See FIGS. 17A and 21, and the attending description.) A filter kernel centered on the virtual pixel center (X,Y) is used to generate weighting values for samples. Samples falling within the support of the filter are included in the weighted average.

In one embodiment, intermediate computations in the weighted average are performed with at least M bits precision where M is larger than 10. Thus, the pixel value generated by sample-to-pixel calculation unit 170-I retains a precision of M bits.

Sample-to-pixel calculation unit 170-I may use the M-bit pixel value to perform gamma correction. Gamma correction involves the evaluation of a function f(V) on the M-bit pixel value V in order to compensate for the nonlinear response curve of a display device. The correction function f approximates the inverse of the nonlinear response curve. The function evaluation may be implemented as a table lookup. In order to obtain a gamma corrected value f(V) with 10 bits precision, the pre-corrected pixel value V may have at least 12 bits precision. Thus, precision length M may be at least 12. In one embodiment, M is exactly equal to 12.

Because of the dithering performed by dither unit 700, the M-bit pixel value, which is a weighted average of 10-bit samples (i.e. the samples after having added the dither values and truncated), more closely approximates the value which would be obtained if the weighted average were performed on the originally-rendered 14-bit samples. In situations where the originally rendered 14-bit samples represent a smoothly varying color field, this approximation property contributes to the elimination of false contouring, especially when M is greater than or equal to 12.

Furthermore, since the support of the filter kernel covers several bins, any bias to the weighted average induced by the dither set used for one bin may be compensated by the dither sets used for the remaining bins which intersect the support of the filter kernel. See FIG. 19 and attending discussion above.

Generalization of Operand Sizes

In the embodiment described above, it was assumed that the sample values as originally rendered by render units 150 were 14 bits, and that the truncated sample values stored into sample buffer 162 were 10 bits. This embodiment naturally generalizes. Let <K,L,M> denote an embodiment where (a) the sample values as originally rendered by render units 150 are K-bit quantities, (b) the truncated sample values stored into sample buffer 162 are L bit quantities, and (c) the precision length of the weighted average generated by sample-to-pixel calculation unit 170-I is equal to M. The present invention contemplates any embodiment <K,L,M> where K and M are larger than L.

Figure 20:
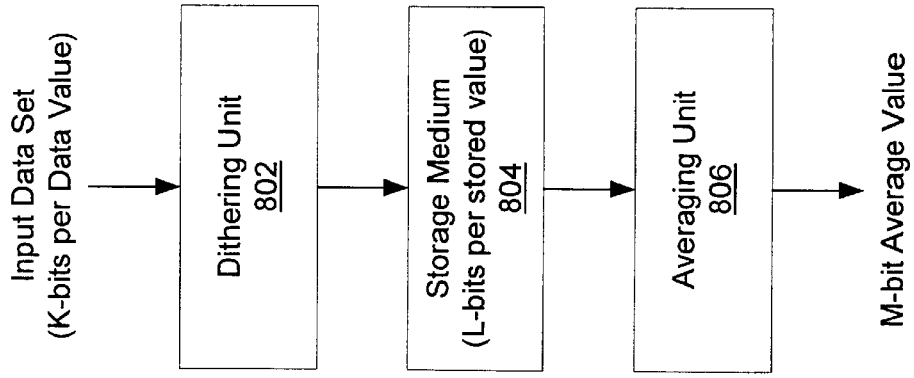
FIG. 20 illustrates one embodiment of a spatial dithering system.

FIG. 20 illustrates one embodiment of a spatial dithering system. The spatial dithering system comprises a dithering unit 802, a storage medium 804, and an averaging unit 806. Dithering unit 802 may be implemented in hardware such as dither unit 700. Alternatively, dither unit 802 may be implemented by a programmable processor (e.g. a DSP core). Storage medium 804 couples to dithering unit 802, and may be any form of memory device or combination of memory devices as desired. For example, storage medium 804 may be an array of 3DRAM64 memories. Averaging unit 806 couples to storage medium 804, and may be implemented in dedicated hardware or in software. In one embodiment, averaging unit 806 is realized by one of sample-to-pixel calculation units 170.

Dithering unit 802 is configured to receive a set X of K-bit data values $X_i$ and a corresponding set of dither values $D_i$. In one embodiment, the set of data values represent a spatially co-located group of rendered sample values such as color or alpha. The dithering unit 802 is further configured (a) to add each data value $X_i$ and the corresponding dither value $D_i$, and (b) to truncate the resultant sums $S_i$ to L-bits. The set Y of L-bit truncated sums may be written to storage medium 804. In one alternative embodiment, dither values $D_i$ may be stored within dithering unit 802.

The dither values $D_i$ may have an average value of ½ (or approximately ½). When adding the dither values to the data values $X_i$, the ½ bit position (i.e. the bit position whose weight equals ½) of the dither values is aligned with the most significant bit of the resultant sum which is to be truncated. More generally, the dither values may have an average value of $2^{-u}$ (or approximately $2^{-u}$) where u is an integer.

The dither values $D_i$ may approximate a uniform distribution of numbers between $\frac{1}{2}-A$ and $\frac{1}{2}+A$, where A is a positive real number greater than or equal to one. In one embodiment, A equals one. For example, assuming that length N of the data set equals $2^n$, the dither values may be chosen as:

$$\left\{ \frac{k}{2^{n-1}} + \frac{1}{2} : k = -2^{n-1}, \ldots, -2, -1, 0, 1, 2, \ldots, (2^{n-1}-1) \right\}.$$

Averaging unit 806 is configured to read the set Y of L-bit truncated sums from the storage medium, and to compute an average of the L-bit truncated sums. The average may be a weighted average, a straight average (i.e. total/population-size), a nonlinear average, etc. The averaging computations are performed with M-bit precision, where M is larger than L. Thus, the average value resulting from the average computation is an M-bit quantity. Because of the dithering performed by dithering unit 802, the M-bit average value closely approximates the average of the original K-bit data values.

In one embodiment, the average value generated by averaging unit 806 represents a pixel value (e.g. color or alpha value). The pixel value may be transmitted to a display device for image visualization. Gamma correction may be applied to the pixel value prior to transmission to the display device.

Dithering unit 802 may receive a succession X(1), X(2), X(3), . . . of input data sets, and may apply the above dithering operation to each input data set X(k). Thus, dithering unit 802 generates a set Y(k) of L-bit truncated sums for each input data set X(k), and stores the set Y(k) into storage medium 804. Dithering unit 802 may repeatedly use the same set of dither values to dither each input data set X(k). Alternatively, different sets of dither values may be used for successive input data sets. Averaging unit 806 reads each set Y(k) of L-bit truncated sums from the storage medium 804, and generates a corresponding average value V(k). Thus, averaging unit 806 produces a succession V(1), V(2), V(3), . . . of average values. The sequence of average values V(1), V(2), V(3), . . . may represent a filtered image.

Figure 21:
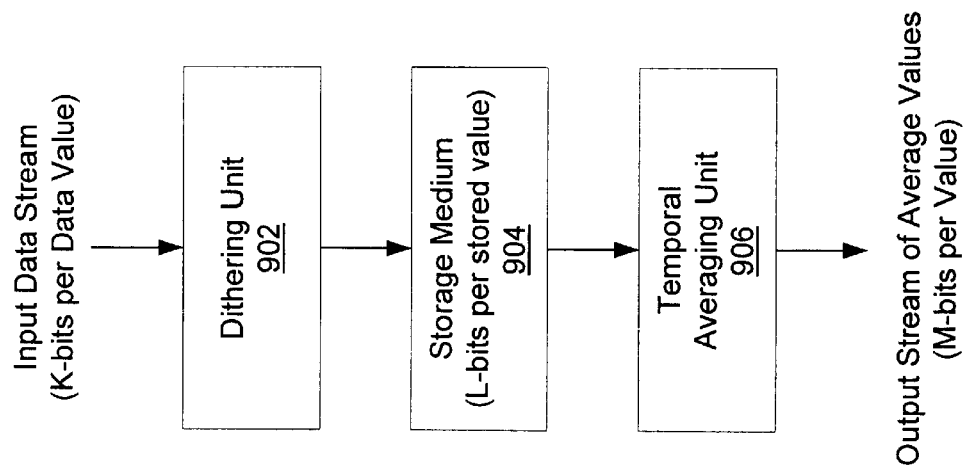
FIG. 21 illustrates one embodiment of a temporal dithering system.

FIG. 21—Temporal Dithering

FIG. 21 illustrates an embodiment of a temporal dithering system. The temporal dithering system comprises a temporal dithering unit 902, a storage medium 904, and a temporal averaging unit 906. Dithering unit 902 may be implemented using hardware such as dither unit 700. Alternatively, dither unit 902 may be implemented in software executing on a processor. Storage medium 904 couples to dithering unit 902, and may be any form of memory device or combination of memory devices as desired. Temporal averaging unit 906 couples to storage medium 904, and may be implemented in dedicated hardware or in programmable hardware (e.g. a DSP core).

Dithering unit 902 is configured to receive a temporal stream u(0), u(1), u(2), u(3), . . . , u(j), . . . of K-bit data values. Dithering unit 902 is further configured to add a dither value D(j) to each K-bit data value U(j) of the temporal stream. The dither values D(j) may repeat, i.e. may be periodic with period N. Thus D(j)=D(j+kN) for any integer k. Dithering unit 902 may cyclically read the N dither values from a memory located internal to or external to dither unit 902. The sum values S(j)=D(j)+U(j) are truncated to L bits, where L is smaller than K, i.e. the (K−L) least significant bits of the sums S(j) are discarded. The truncation may be performed to accommodate the storage capacity of storage medium 904. The truncated sums Trn[S(j)] are written into storage medium 904. Alternatively, L-bit truncated sums Trn[S(j)] may be transmitted onto a transmission medium (not shown).

Temporal averaging unit 906 is configured to read the stream of L-bit truncated sums Trn[S(j)] from storage medium 904 (or alternatively, to receive the L-bit truncated sums from the transmission medium), and to compute a time average of the L-bit truncated sums. For example, temporal averaging unit 906 may implement a FIR filter operation on the truncated sums Trn[S(j)]. Temporal average unit 906 may alternatively implement an IIR filter, a nonlinear filter, a median filter, etc. The length of the filter used by temporal averaging unit 906 may be a multiple of N.

Because of the dithering performed by dithering unit 902, the output signal Z(j) from the temporal average unit 906 closely approximates the signal which would have been obtained from performing the same averaging operation on the original K-bit data values.

The time-average computations may be performed with M-bit precision, where M is larger than L. Thus, the average values Z(j) generated by the temporal averaging unit 906 may be M-bit quantities.

Dithering with Truncation Versus Dithering with Rounding

Many of the above embodiments have described dithering in terms of adding dither values $D_i$ with average value $\frac{1}{2}$ to corresponding input data values $X_i$ to obtain sums $Y_i = X_i + D_i$, and truncating the sums $Y_i$ to lower-precision values $Z_i$. Now, recall that the rounding of any number U may be achieved by adding $\frac{1}{2}$ and then truncating: Round(U)=Trn(U+$\frac{1}{2}$). Furthermore, observe that sums $Y_i$ may be expressed in following form: $Y_i = X_i + (D_i - \frac{1}{2}) + \frac{1}{2}$, and that the set of numbers $D_i - \frac{1}{2}$ has an average value of zero. Thus, the truncation of sum $Y_i$ is the same as the rounding of $X_i + (D_i - \frac{1}{2})$. In other words, all the above embodiments may be modified to operate with dither values $E_i$ having average value zero provided that the resulting sums $X_i + E_i$ are rounded instead of truncated, i.e. truncation units may be replaced by rounding units.

Dithering of Pixels Prior to Display

In one embodiment, sample-to-pixel calculation units 170 may spatially dither pixel values prior to display to further address the problem of false contouring. In other words, each sample-to-pixel calculation unit 170-I may add a zero-average noise function to the pixel values prior to transmission to a display device. The human eye may perform a spatial averaging of the pixel values which eliminates the false contouring.

In one alternative embodiment, the graphics system may be configured to directly render pixels in response to received geometry data, and thus, the graphics system may not include sample-to-pixel calculation units and instead utilize a traditional frame buffer. The graphics system may dither pixel values, i.e. add zero-mean spatial noise to the pixel values, prior to transmitting the pixel values to one or more video output ports. The pixel rendering and dithering may be performed in dedicated hardware, programmable hardware (e.g. a DSP core), or any combination thereof. The one or more display devices may then display images formed by the dithered pixel values. The eye and brain (i.e. visual cortex) of an observer then performs spatial filtering which allows the observer to interpolate perceived color values with higher resolution than the display resolution. Advantageously, this may result in a more visually pleasing and more accurate perceived image.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
a dithering unit configured to (a) receive a plurality of sample values, (b) add dither values to the sample values to generate resultant addition values, and (c) truncate the resultant addition values to truncated values;
a sample buffer configured to store the truncated values; and
a sample-to-pixel calculation unit configured to read the truncated values from the sample buffer and generate a pixel value by filtering the truncated values;
wherein the truncated values comprise L-bit quantities, wherein L is an integer, wherein the pixel value comprises an M-bit quantity, wherein M is an integer larger than L;
wherein the pixel value is supplied for video output to a display device without being stored in an intervening frame buffer.

2. The graphics system of claim 1, further comprising a rendering unit configured to compute the plurality of sample values at a corresponding plurality of sample positions in a two-dimensional virtual screen space.

3. The graphics system of claim 1, wherein the dither values have an average value of approximately ½.

4. The graphics system of claim 3, wherein the dithering unit is configured to add the dither values and the sample values so that the ½ bit position of the dither values aligns with the most significant bit position which is removed in truncating each of the resultant values.

5. The graphics system of claim 1, wherein the dither values have an average value of approximately zero, wherein the dithering unit is further configured to add one-half to the resultant addition values prior to truncation.

6. The graphics system of claim 1, wherein the dither values approximate a uniform distribution of numbers between −A+½ and A+½, where A is a number greater than or equal to one.

7. The graphics system of claim 6, wherein A equals one.

8. The graphics system of claim 1, wherein the dither values approximate a uniform distribution of numbers between −A and A, where A is a number greater than or equal to one, wherein the dithering unit is further configured to add one-half to the resultant addition values prior to truncation.

9. The graphics system of claim 1, wherein the sample-to-pixel calculation unit is configured to filter the truncated values by computing a weighted average of at least a subset of the truncated values.

10. The graphics system of claim 1, wherein the sample values comprise color values.

11. The graphics system of claim 1, wherein the sample values comprise alpha values.

12. The graphics system of claim 10, wherein L equals ten.

13. The graphics system of claim 1, wherein the sample-to-pixel calculation unit is further configured to determine a gamma corrected pixel value in response to the pixel value.

14. The graphics system of claim 11, wherein the pixel value comprises at least 12 bits and the gamma corrected pixel value has at least 10 bits of precision.

15. A method for image generation comprising:
receiving a plurality of sample values;
adding dither values to the sample values to generated resultant addition values;
truncating the resultant addition values to truncated values;
storing the truncated values into a sample buffer;
reading the truncated values from the sample buffer;
generating a pixel value by filtering the truncated values;
supplying the pixel value for video output to a display device without storing the pixel value in an intervening frame buffer;
wherein the truncated values comprise L-bit quantities, wherein L is an integer, wherein the pixel value comprises an M-bit quantity, wherein M is an integer larger than L.

16. The method of claim 15 further comprising computing the plurality of sample values at a corresponding plurality of sample positions in a two-dimensional virtual screen space, wherein said computing is performed prior to said receiving.

17. The method of claim 15, wherein the dither values have an average value of approximately one-half.

18. The graphics system of claim 17, wherein said adding the dither values to each of the sample values is performed so that the ½ bit position of the dither values aligns with the most significant bit position which is removed in truncating each of the resultant values.

19. The method of claim 15 further comprising adding one-half to the resultant addition values prior to said truncating, wherein the dither values have an average value of approximately zero.

20. The method of claim 15, wherein the dither values approximate a uniform distribution of numbers between −A+½ and A+½, wherein A is a number greater than or equal to one.

21. The method of claim 20, wherein A equals one.

22. The method of claim 15 further comprising adding one-half to the resultant addition values prior to said truncating, wherein the dither values approximate a uniform distribution of numbers between −A and A, wherein A is a number greater than or equal to one.

23. The method of claim 15, wherein said filtering the truncated values comprises computing a weighted average of at least a subset of the truncated values.

24. The method of claim 15, wherein the sample values comprise color values.

25. The method of claim 15, wherein the sample values comprise alpha values.

26. The method of claim 25, wherein L equals ten.

27. The method of claim 15 further comprising determining a gamma corrected pixel value in response to the pixel value.

28. The method of claim 27, wherein the pixel value comprises at least 12 bits and the gamma corrected pixel value has at least 10 bits of precision.

29. A graphics system comprising:
a processor configured to (a) receive a plurality of sample values, (b) add dither values to the sample values to generate resultant addition values, and (c) truncate the resultant addition values to truncated values;
a sample buffer configured to store the truncated values;
a sample-to-pixel calculation unit configured to read the truncated values from the sample buffer and generate a pixel value by filtering the truncated values;
wherein the pixel value is supplied for video output to a display device without being stored in an intervening frame buffer;

wherein the truncated values comprise L-bit quantities, wherein L is an integer, wherein the pixel value comprises an M-bit quantity, wherein M is an integer larger than L.

30. The graphics system of claim 29, wherein the processor is further to configured to receive graphics data, and, in response to the graphics data, to compute the plurality of sample values at a corresponding plurality of sample positions in a two-dimensional virtual screen space.

31. The graphics system of claim 29, wherein the dither values have an average value of approximately ½.

32. The graphics system of claim 29, wherein the dither values have an average value of approximately zero, wherein the processor is further configured to add one-half to the resultant addition values prior to truncation.

33. A computer system comprising:
- a central processing unit (CPU) coupled to a system bus and configured to generate graphics data;
- a rendering unit configured to (a) receive the graphics data, (b) compute a plurality of sample values in response to the graphics data, (c) add dither values to the sample values to generate resultant addition values, and (d) truncate the resultant addition values to truncated values;
- a sample buffer configured to store the truncated values;
- a sample-to-pixel calculation unit configured to read the truncated values from the sample buffer and generate a pixel value by filtering the truncated values;
- a display device configured to receive the pixel value and generate a visual output in response to the pixel value;
- one or more input devices operatively coupled to the system bus and configured to provide input signals to the computer system in response to user manipulations of the one or more input devices;
- wherein the pixel value is supplied for output to the display device without being stored in an intermediate frame buffer;

wherein the truncated values comprise L-bit quantities, wherein L is an integer, wherein the pixel value comprises an M-bit quantity, wherein M is an integer larger than L.

34. The graphics system of claim 33, wherein the dither values have an average value of approximately ½.

35. The graphics system of claim 34, wherein the dithering unit is configured to add the dither values and the sample values so that the ½ bit position of the dither values aligns with the most significant bit position which is removed in truncating each of the resultant values.

36. The graphics system of claim 33, wherein the dither values have an average value of approximately zero, wherein the rendering unit is further configured to add one-half to the resultant addition values prior to truncation.

37. The graphics system of claim 1, wherein the sample buffer is double buffered.

38. The graphics system of claim 1, wherein the sample buffer is configured to store an entire frame of sample values.

39. The graphics system of claim 1 wherein the dither values include a first subset and a second subset, wherein the second subset of dither values is complementary to the first set of dither values, wherein the first subset of dither values are applied to sample values in each bin of a first set of bins in sample space, wherein the second subset of dither values are applied to sample values in each bin of a second set of bins in sample space, wherein the first bins and the second bins are arranged in a checkerboard fashion in sample space.

40. The graphics system of claim 39, wherein the sample-to-pixel calculation unit filters the truncated values with a filter having a support that covers more than one bin in sample space.

\* \* \* \* \*